(12) United States Patent
Tan

(10) Patent No.: US 10,848,437 B2
(45) Date of Patent: *Nov. 24, 2020

(54) QUALITY OF SERVICE CONTROL METHOD AND DEVICE FOR SOFTWARE-DEFINED NETWORKING

(71) Applicant: HUAWEI TECHNOLOGIES CO., LTD., Shenzhen, Guangdong (CN)

(72) Inventor: Shiyong Tan, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/410,232

(22) Filed: May 13, 2019

(65) Prior Publication Data

US 2019/0268282 A1 Aug. 29, 2019

Related U.S. Application Data

(63) Continuation of application No. 15/389,178, filed on Dec. 22, 2016, now Pat. No. 10,313,266, which is a
(Continued)

(51) Int. Cl.
*H04L 12/28* (2006.01)
*H04L 12/927* (2013.01)
(Continued)

(52) U.S. Cl.
CPC .......... *H04L 47/805* (2013.01); *H04L 43/08* (2013.01); *H04L 45/64* (2013.01)

(58) Field of Classification Search
None
See application file for complete search history.

(56) References Cited

U.S. PATENT DOCUMENTS 8,693,470 B1 * 4/2014 Maxwell ............... H04L 45/302
370/230
10,313,266 B2 * 6/2019 Tan ........................ H04L 45/64
(Continued)

FOREIGN PATENT DOCUMENTS

CN 103051629 A 4/2013
CN 103250383 A 8/2013
(Continued)

OTHER PUBLICATIONS

S. Maeda; "Control of packet in accordance with flowrate Transaction with plural controllers"; Network Forefront Seminar—The ninth session—OpenFlow (new function); Network Leading-edge Course; Nikkei Network; vol. 152; Japan; Dec. 2012; 18 pages.
(Continued)

*Primary Examiner* — Clemence S Han
(74) *Attorney, Agent, or Firm* — Fish & Richardson P.C.

(57) ABSTRACT

Example quality of service (QoS) control methods and apparatus for software defined network (SDN) are described. One example method includes determining a flow entry that includes QoS information. The QoS information is used to indicate a QoS processing rule that includes a QoS parameter. The QoS processing rule is used to instruct to perform QoS control on a data packet according to the QoS parameter. The flow entry is sent to a forwarding plane device, so that the forwarding plane device obtains the QoS processing rule, and performs QoS control on a target packet according to the QoS parameter in the QoS processing rule, where the target packet is a data packet that matches the flow entry.

18 Claims, 7 Drawing Sheets

Related U.S. Application Data continuation of application No. PCT/CN2014/080791, filed on Jun. 26, 2014.

(51) Int. Cl.
  *H04L 12/26* (2006.01)
  *H04L 12/715* (2013.01)

(56) References Cited

U.S. PATENT DOCUMENTS

| | | | | |
|---|---|---|---|---|
| 2002/0067722 A1* | 6/2002 | Kanakubo | H04L 45/00 | 370/389 |
| 2005/0265338 A1* | 12/2005 | Chapman | H04L 12/2801 | 370/389 |
| 2005/0265397 A1* | 12/2005 | Chapman | H04L 12/2801 | 370/490 |
| 2006/0168612 A1* | 7/2006 | Chapman | G06F 11/0709 | 725/11 |
| 2008/0183604 A1* | 7/2008 | Chou | G06Q 50/32 | 705/30 |
| 2011/0080830 A1 | 4/2011 | Ko et al. | | |
| 2012/0120964 A1* | 5/2012 | Koponen | H04L 41/0816 | 370/409 |
| 2012/0147898 A1* | 6/2012 | Koponen | H04L 49/70 | 370/422 |
| 2012/0155264 A1 | 6/2012 | Sharma et al. | | |
| 2012/0243412 A1 | 9/2012 | Voruganti et al. | | |
| 2012/0263186 A1 | 10/2012 | Ueno | | |
| 2013/0058350 A1* | 3/2013 | Fulton | H04L 41/0896 | 370/400 |
| 2013/0058358 A1* | 3/2013 | Fulton | H04L 41/0893 | 370/412 |
| 2013/0148500 A1* | 6/2013 | Sonoda | H04L 45/38 | 370/231 |
| 2013/0275620 A1 | 10/2013 | Morita et al. | | |
| 2013/0322257 A1* | 12/2013 | Shimonishi | H04L 41/0893 | 370/236 |
| 2014/0036673 A1 | 2/2014 | Ehara | | |
| 2014/0079070 A1* | 3/2014 | Sonoda | H04L 45/308 | 370/392 |
| 2014/0098674 A1 | 4/2014 | Sonoda et al. | | |
| 2014/0112150 A1* | 4/2014 | Ko | H04L 47/24 | 370/236 |
| 2014/0177840 A1 | 6/2014 | Liu | | |
| 2014/0247714 A1* | 9/2014 | Sonoda | H04L 45/308 | 370/230 |
| 2015/0103743 A1 | 4/2015 | Tamura et al. | | |
| 2015/0110095 A1* | 4/2015 | Tan | H04W 40/02 | 370/338 |
| 2016/0006606 A1* | 1/2016 | Zhu | H04L 41/0803 | 370/338 |
| 2016/0191406 A1* | 6/2016 | Xiao | H04L 45/38 | 370/235 |
| 2017/0111231 A1* | 4/2017 | Ashida | H04L 41/12 | |

FOREIGN PATENT DOCUMENTS

| | | |
|---|---|---|
| CN | 103338163 A | 10/2013 |
| CN | 103346922 A | 10/2013 |
| CN | 103597787 A | 2/2014 |
| WO | WO2011037105 A1 | 3/2011 |
| WO | WO2012098774 A1 | 7/2012 |
| WO | WO2012144190 A1 | 10/2012 |
| WO | WO2013179542 A1 | 12/2013 |
| WO | WO2014082590 A1 | 6/2014 |

OTHER PUBLICATIONS

Egilmez et al.; "OpenQos; An OpenFlow Controller Design for Multimedia Delivery with End-to-End Quality of Service over Software-Defined Networks"; Signal & Information Processing Association Annual Summit and Conference (APSIP A ASC) 03.12; 8 pages.

Office Action issued in Chinese Application No. 201910849160.6 dated May 26, 2020, 18 pages (with English translation).

EPO Communication pursuant to Article 94(3) EPC issued in European Application No. 14895642.8 dated Aug. 6, 2020, 7 pages.

* cited by examiner

QUALITY OF SERVICE CONTROL METHOD AND DEVICE FOR SOFTWARE-DEFINED NETWORKING

CROSS-REFERENCE TO RELATED APPLICATIONS

This application is a continuation of U.S. application Ser. No. 15/389,178, filed on Dec. 22, 2016, which is a continuation of International Application No. PCT/CN2014/080791, filed on Jun. 26, 2014. The afore-mentioned patent applications are hereby incorporated by reference in their entireties.

TECHNICAL FIELD

The present invention relates to the communications field, and specifically, to a quality of service (Quality of Service, QoS) control method and a device for software-defined networking (Software Defined Networking, SDN).

BACKGROUND

In a current network, there are various network devices, such as routers, gateways, switches, firewalls, and various servers. The devices that implement various network functions generally include respective control modules, and the distributed control modules lead to an extremely complex network deployment.

To improve network deployment flexibility and manageability, a software-defined networking (Software Defined Network, SDN) concept is put forward in the industry. In SDN, a control plane device implements network control and management functions, and a forwarding plane device implements a forwarding function in a network. OpenFlow (OpenFlow) is a mainstream SDN network control protocol at present. In the OpenFlow, a control plane device controls behavior of a forwarding plane device by using a flow entry. The flow entry may indicate a data packet that needs to be processed and a corresponding operation.

QoS refers to a network capability to provide a service of a higher priority. Quality of service of a network can be improved by performing QoS control on a data packet. In a conventional network, because each network element itself is integrated with a control function, QoS control on a data packet is extremely easy to perform. However, for an SDN network, currently there is no mechanism to implement a QoS control function.

SUMMARY

Embodiments of the present invention provide a QoS control method and a device for SDN, which can implement a QoS control function in the SDN.

According to a first aspect, a control plane device is provided, including: a determining unit, configured to determine a flow entry, where the flow entry includes QoS information, the QoS information is used to indicate a QoS processing rule, the QoS processing rule includes a QoS parameter, and the QoS processing rule is used to instruct to perform QoS control on a data packet according to the QoS parameter; and a sending unit, configured to send the flow entry to a forwarding plane device, so that the forwarding plane device obtains the QoS processing rule, and performs QoS control on a target packet according to the QoS parameter in the QoS processing rule, where the target packet is a data packet that matches the flow entry.

With reference to the first aspect, in a first possible implementation manner, the QoS parameter includes at least one of the following: a packet drop rate parameter, a delay parameter, a jitter parameter, or a rate limiting parameter; and correspondingly, the QoS processing rule is used to indicate at least one of the following: performing packet drop control on the target packet according to the packet drop rate parameter; performing delay control on the target packet according to the delay parameter; performing jitter control on the target packet according to the jitter parameter; or performing rate limiting control on the target packet according to the rate limiting parameter.

With reference to the first aspect or the first possible implementation manner of the first aspect, in a second possible implementation manner, the QoS information includes the QoS processing rule:

With reference to the second possible implementation manner of the first aspect, in a third possible implementation manner, the QoS processing rule includes at least one of the following instructions: a first instruction, where the first instruction includes the packet drop rate parameter, and the first instruction is used to instruct to perform packet drop control on the target packet according to the packet drop rate parameter; a second instruction, where the second instruction includes the delay parameter, and the second instruction is used to instruct to perform delay control on the target packet according to the delay parameter; a third instruction, where the third instruction includes the jitter parameter, and the third instruction is used to instruct to perform jitter control on the target packet according to the jitter parameter; or a fourth instruction, where the fourth instruction includes the rate limiting parameter, and the fourth instruction is used to instruct to perform rate limiting control on the target packet according to the rate limiting parameter.

With reference to the first aspect or the first possible implementation manner, in a fourth possible implementation manner, the sending unit is further configured to send configuration information to the forwarding plane device, and the configuration information includes the QoS processing rule and an index identifier corresponding to the QoS processing rule; and
the QoS information includes the index identifier.

With reference to the fourth possible implementation manner of the first aspect, in a fifth possible implementation manner, the configuration information includes a meter entry, where a meter band of the Meter entry includes the QoS processing rule, and the index identifier is an identifier of the Meter entry; and correspondingly, the QoS information includes a Meter instruction, where the Meter instruction includes the identifier of the Meter entry; or
the configuration information includes queue information, where a queue in the queue information includes the QoS processing rule, and the index identifier is an identifier of the queue; and correspondingly, the QoS information includes a queue instruction, where the queue instruction includes the identifier of the queue; or
the QoS information includes a customized QoS processing instruction, where the customized QoS processing instruction includes the index identifier, and the customized QoS processing instruction is used to instruct to obtain, according to the index identifier, the QoS processing rule from the configuration information.

According to a second aspect, a forwarding plane device is provided, including: a receiving unit, configured to receive a data packet and receive a flow entry sent by a control plane device; and a processing unit, configured to determine, according to the flow entry, that the data packet is a target packet, where the target packet is a data packet that matches the flow entry, the flow entry includes QoS information, the QoS information is used to indicate a QoS processing rule, and the QoS processing rule includes a QoS parameter; obtain the QoS processing rule according to the QoS information; and perform QoS control on the target packet on a basis of the QoS parameter according to the QoS processing rule.

With reference to the second aspect, in a first possible implementation manner, the QoS parameter includes at least one of the following: a packet drop rate parameter, a delay parameter, a jitter parameter, or a rate limiting parameter; and correspondingly, that the processing unit is configured to perform QoS control on the target packet on a basis of the QoS parameter according to the QoS processing rule includes at least one of the following: the processing unit is configured to perform packet drop control on the target packet on a basis of the packet drop rate parameter according to the QoS processing rule; the processing unit is configured to perform delay control on the target packet on a basis of the delay parameter according to the QoS processing rule; the processing unit is configured to perform jitter control on the target packet on a basis of the jitter parameter according to the QoS processing rule; or the processing unit is configured to perform rate limiting control on the target packet on a basis of the rate limiting parameter according to the QoS processing rule.

With reference to the second aspect or the first possible implementation manner of the second aspect, in a second possible implementation manner, the QoS information includes the QoS processing rule; and that the processing unit is configured to obtain the QoS processing rule according to the QoS information includes: the processing unit is configured to obtain the QoS processing rule from the QoS information.

With reference to the second possible implementation manner of the second aspect, in a third possible implementation manner, the QoS processing rule includes at least one of the following instructions: a first instruction, where the first instruction includes the packet drop rate parameter; a second instruction, where the second instruction includes the delay parameter; a third instruction, where the third instruction includes the jitter parameter; or a fourth instruction, where the fourth instruction includes the rate limiting parameter; and correspondingly, that the processing unit is configured to perform QoS control on the target packet on a basis of the QoS parameter according to the QoS processing rule includes at least one of the following: the processing unit is configured to perform packet drop control on the target packet on a basis of the packet drop rate parameter according to the first instruction; the processing unit is configured to perform delay control on the target packet on a basis of the delay parameter according to the second instruction; the processing unit is configured to perform jitter control on the target packet on a basis of the jitter parameter according to the third instruction; or the processing unit is configured to perform rate limiting control on the target packet on a basis of the rate limiting parameter according to the fourth instruction.

With reference to the second aspect or the first possible implementation manner of the second aspect, in a fourth possible implementation manner, the processing unit stores configuration information, and the configuration information includes the QoS processing rule and an index identifier corresponding to the QoS processing rule; the QoS information includes the index identifier; and that the processing unit is configured to obtain the QoS processing rule according to the QoS information includes: the processing unit is configured to obtain the QoS processing rule from the configuration information according to the index identifier.

With reference to the fourth possible implementation manner of the second aspect, in a fifth possible implementation manner, the configuration information includes a meter entry, a meter band of the Meter entry includes the QoS processing rule, the index identifier is an identifier of the Meter entry, the QoS information includes a Meter instruction, and the Meter instruction includes the identifier of the Meter entry; and correspondingly, that the processing unit is configured to obtain the QoS processing rule from the configuration information according to the index identifier includes: the processing unit is configured to obtain the Meter entry corresponding to the identifier of the Meter entry according to the Meter instruction, and obtain the QoS processing rule from the Meter Band of the Meter entry; or the configuration information includes queue information, where a queue in the queue information includes the QoS processing rule, the index identifier is an identifier of the queue, the QoS information includes a queue instruction, and the queue instruction includes the identifier of the queue; and correspondingly, that the processing unit is configured to obtain the QoS processing rule from the configuration information according to the index identifier includes: the processing unit is configured to obtain, from the queue information according to the queue instruction, the queue corresponding to the identifier of the queue, and obtain the QoS processing rule from the queue; or the QoS information includes a customized QoS processing instruction, where the customized QoS processing instruction includes the index identifier; and correspondingly, that the processing unit is configured to obtain the QoS processing rule from the configuration information according to the index identifier includes: the processing unit is configured to obtain the QoS processing rule corresponding to the index identifier from the configuration information according to the customized QoS processing instruction.

According to a third aspect, a QoS control method for SDN is provided, including: determining, by a control plane device, a flow entry, where the flow entry includes QoS information, the QoS information is used to indicate a QoS processing rule, the QoS processing rule includes a QoS parameter, and the QoS processing rule is used to instruct to perform. QoS control on a data packet according to the QoS parameter; and sending, by the control plane device, the flow entry to a forwarding plane device, so that the forwarding plane device obtains the QoS processing rule, and performs QoS control on a target packet according to the QoS parameter in the QoS processing rule, where the target packet is a data packet that matches the flow entry.

With reference to the third aspect, in a first possible implementation manner, the QoS parameter includes at least one of the following: a packet drop rate parameter, a delay parameter, a jitter parameter, or a rate limiting parameter; and correspondingly, the QoS processing rule is used to indicate at least one of the following: performing packet drop control on the target packet according to the packet drop rate parameter; performing delay control on the target packet according to the delay parameter; performing jitter control on the target packet according to the jitter parameter; or performing rate limiting control on the target packet according to the rate limiting parameter.

With reference to the third aspect or the first possible implementation manner of the third aspect, in a second possible implementation manner, the QoS information includes the QoS processing rule.

With reference to the second possible implementation manner of the third aspect, in a third possible implementation manner, the QoS processing rule includes at least one of the following instructions: a first instruction, where the first instruction includes the packet drop rate parameter, and the first instruction is used to instruct to perform packet drop control on the target packet according to the packet drop rate parameter; a second instruction, where the second instruction includes the delay parameter, and the second instruction is used to instruct to perform delay control on the target packet according to the delay parameter; a third instruction, where the third instruction includes the jitter parameter, and the third instruction is used to instruct to perform jitter control on the target packet according to the jitter parameter; or a fourth instruction, where the fourth instruction includes the rate limiting parameter, and the fourth instruction is used to instruct to perform rate limiting control on the target packet according to the rate limiting parameter.

With reference to the third aspect or the first possible implementation manner of the third aspect, in a fourth possible implementation manner, the method further including: sending, by the control plane device, configuration information to the forwarding plane device, where the configuration information includes the QoS processing rule and an index identifier corresponding to the QoS processing rule; and the QoS information includes the index identifier.

With reference to the fourth possible implementation manner of the third aspect, in a fifth possible implementation manner, the configuration information includes a meter entry, where a meter band of the Meter entry includes the QoS processing rule, and the index identifier is an identifier of the Meter entry; and correspondingly, the QoS information includes a Meter instruction, where the Meter instruction includes the identifier of the Meter entry; or the configuration information includes queue information, where a queue in the queue information includes the QoS processing rule, and the index identifier is an identifier of the queue; and correspondingly, the QoS information includes a queue instruction, where the queue instruction includes the identifier of the queue; or the QoS information includes a customized QoS processing instruction, where the customized QoS processing instruction includes the index identifier, and the customized QoS processing instruction is used to instruct to obtain, according to the index identifier, the QoS processing rule from the configuration information.

According to a fourth aspect, a QoS control method for SDN is provided, including: receiving, by a forwarding plane device, a data packet, and receiving a flow entry sent by a control plane device; determining, by the forwarding plane device according to the flow entry, that the data packet is a target packet, where the target packet is a data packet that matches the flow entry, the flow entry includes QoS information, the QoS information is used to indicate a QoS processing rule, and the QoS processing rule includes a QoS parameter; obtaining, by the forwarding plane device, the QoS processing rule according to the QoS information; and performing, by the forwarding plane device, QoS control on the target packet on a basis of the QoS parameter according to the QoS processing rule.

With reference to the fourth aspect, in a first possible implementation manner, the QoS parameter includes at least one of the following: a packet drop rate parameter, a delay parameter, a jitter parameter, or a rate limiting parameter; and correspondingly, the performing, by the forwarding plane device, QoS control on the target packet on a basis of the QoS parameter according to the QoS processing rule includes at least one of the following: performing, by the forwarding plane device, packet drop control on the target packet on a basis of the packet drop rate parameter according to the QoS processing rule; performing, by the forwarding plane device, delay control on the target packet on a basis of the delay parameter according to the QoS processing rule; performing, by the forwarding plane device, jitter control on the target packet on a basis of the jitter parameter according to the QoS processing rule; or performing, by the forwarding plane device, rate limiting control on the target packet on a basis of the rate limiting parameter according to the QoS processing rule.

With reference to the fourth aspect or the first possible implementation manner of the fourth aspect, in a second possible implementation manner, the QoS information includes the QoS processing rule; and the obtaining, by the forwarding plane device, the QoS processing rule according to the QoS information includes: obtaining, by the forwarding plane device, the QoS processing rule from the QoS information.

With reference to the second possible implementation manner of the fourth aspect, in a third possible implementation manner, the QoS processing rule includes at least one of the following instructions: a first instruction, where the first instruction includes the packet drop rate parameter; a second instruction, where the second instruction includes the delay parameter; a third instruction, where the third instruction includes the jitter parameter; or a fourth instruction, where the fourth instruction includes the rate limiting parameter; and correspondingly, the performing, by the forwarding plane device, QoS control on the target packet on a basis of the QoS parameter according to the QoS processing rule includes at least one of the following: performing, by the forwarding plane device, packet drop control on the target packet on a basis of the packet drop rate parameter according to the first instruction; performing, by the forwarding plane device, delay control on the target packet on a basis of the delay parameter according to the second instruction; performing, by the forwarding plane device, jitter control on the target packet on a basis of the jitter parameter according to the third instruction; or performing, by the forwarding plane device, rate limiting control on the target packet on a basis of the rate limiting parameter according to the fourth instruction.

With reference to the fourth aspect or the first possible implementation manner of the fourth aspect, in a fourth possible implementation manner, the forwarding plane device stores configuration information, and the configuration information includes the QoS processing rule and an index identifier corresponding to the QoS processing rule; the QoS information includes the index identifier; and the obtaining, by the forwarding plane device, the QoS processing rule according to the QoS information includes: obtaining, by the forwarding plane device, the QoS processing rule from the configuration information according to the index identifier.

With reference to the fourth possible implementation manner of the fourth aspect, in a fifth possible implementation manner, the configuration information includes a meter entry, a meter band of the Meter entry includes the QoS processing rule, the index identifier is an identifier of the Meter entry, the QoS information includes a Meter instruction, and the Meter instruction includes the identifier of the Meter entry; and correspondingly, the obtaining, by the forwarding plane device, the QoS processing rule from the configuration information according to the index identifier includes: obtaining, by the forwarding plane device, the Meter entry corresponding to the identifier of the Meter entry according to the Meter instruction, and obtaining the QoS processing rule from the Meter Band of the Meter entry; or the configuration information includes queue information, where a queue in the queue information includes the QoS processing rule, the index identifier is an identifier of the queue, the QoS information includes a queue instruction, and the queue instruction includes the identifier of the queue; correspondingly, the obtaining, by the forwarding plane device, the QoS processing rule from the configuration information according to the index identifier includes: obtaining, by the forwarding plane device according to the queue instruction, the queue corresponding to the identifier of the queue from the queue information, and obtaining the QoS processing rule from the queue; or the QoS information includes a customized QoS processing instruction, where the customized QoS processing instruction includes the index identifier; and correspondingly, the obtaining, by the forwarding plane device, the QoS processing rule from the configuration information according to the index identifier includes: obtaining, by the forwarding plane device, the QoS processing rule corresponding to the index identifier from the configuration information according to the customized QoS processing instruction.

In the embodiments of the present invention, because QoS information included in a flow entry that is sent by a control plane device to a forwarding plane device is used to indicate a QoS processing rule, the forwarding plane device can perform QoS control on a target packet according to a QoS parameter included in the QoS processing rule, and a QoS control function in SDN can be implemented.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art on a basis of the embodiments of the present invention without creative efforts shall fall within the protection scope of the present invention.

Technical solutions of the present invention can be applied to various networks in which a control plane is decoupled from a forwarding plane, such as various SDN networks. In addition, the technical solutions of the present invention can also be applied to a Policy and Charging Control (Policy and Charging Control, PCC) system. For the PCC system, a policy and charging rules function (Policy and Charging Rules Function, PCRF) module may execute a control plane function, a gateway may execute a forwarding plane function, and the PCRF may control the gateway.

Figure 1:
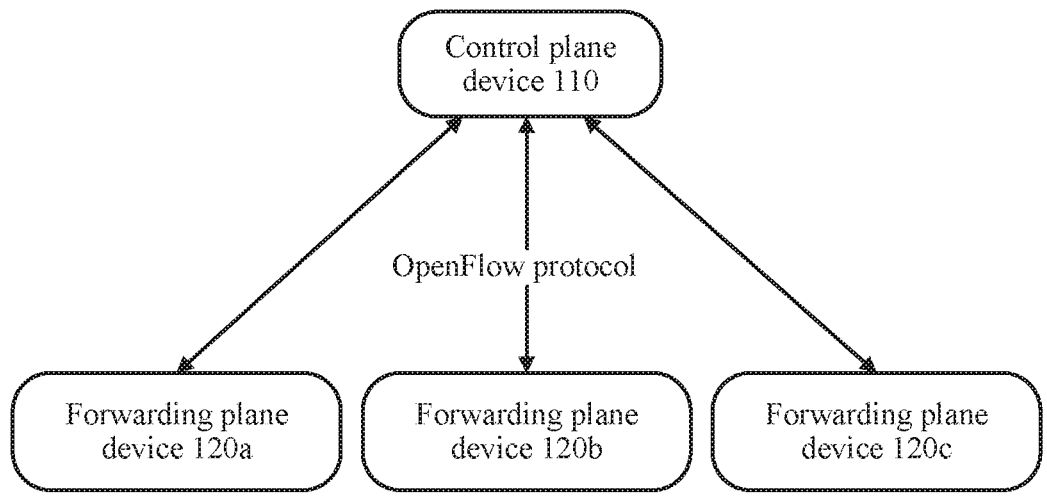
FIG. 1 is a schematic diagram of an exemplary scenario in which embodiments of the present invention can be applied.

FIG. 1 is a schematic diagram of an exemplary scenario in which embodiments of the present invention can be applied.

In FIG. 1, a description is given by using a scenario in which an OpenFlow protocol is used. As shown in FIG. 1, a control plane device 110 may control multiple forwarding plane devices, for example, a forwarding plane device 120a, a forwarding plane device 120b, and a forwarding plane device 120c (which may be collectively referred to as a forwarding plane device 120 in the following) that are shown in FIG. 1. The control plane device 110 may communicate with the forwarding plane device 120 by using the OpenFlow protocol. It should be understood that in the OpenFlow protocol, the control plane device 110 may be referred to as an OpenFlow controller (OpenFlow Controller), and the forwarding plane device 120 may be referred to as an OpenFlow switch (OpenFlow Switch).

The control plane device 110 may control behavior of the forwarding plane device 120 by using a flow table (Flow Table). The following describes content of a flow entry.

A flow entry (Flow Entry) may generally include match fields (Match Fields), a priority (Priority), counters (Counters), instructions (Instructions), timeouts (Timeouts), Cookie, and the like.

A specified value in the match fields may be used to match information such as a header field of a packet and a receive port number, so as to determine whether the packet is a packet that needs to be processed. Generally, the packet that needs to be processed is also referred to as a target packet. The header field of the packet may include an Internet Protocol (Internet Protocol, IP) 5-tuple (a source IP address, a destination IP address, a protocol type, a source port number, and a destination port number), or various header fields in an Ethernet frame header. The header fields in the Ethernet frame header may include a Media Access Control (Media Access Control, MAC) address, a destination MAC address, and the like. The foregoing match may be an exact match, or may be a mask match.

An instruction field may include various instructions, such as an action (Action)-related instruction, a Goto-Table (goto table) instruction, a Meter (meter) instruction, a Write-Metadata (write-metadata) instruction, and the like. Because there is no standard Chinese expression for the Meter instruction, the Meter instruction in this application may be referred to as jiliangqizhiling, jiliangzhiling, jiliangbiaozhiling, or the like.

The action (Action)-related instruction: In the OpenFlow protocol, the action instruction may be classified into two main categories. One main category is an action to be immediately executed, and a corresponding instruction is Apply-Actions, and the other main category is an action that is first stored in an action set and is not executed until a pipeline is complete. An instruction for writing an action to the action set is Write-Actions, and an instruction for clearing all actions in the action set is Clear-Actions. Both the immediately-executed action and the action stored in the action set include multiple categories, including actions that are used to indicate how to operate a packet, such as forwarding, dropping, packet header modifying, encapsulation, decapsulation, and sending a packet to the control plane device 110.

The action-related instruction may further include a set-queue instruction Set-Queue (set-queue). When a data packet is forwarded by using a port, a queue identity (Identity, ID) corresponding to the port may be set by using the instruction.

The Goto-Table instruction is a pipeline control instruction for instructing a packet to go among flow tables, that is, to go from one flow table to another flow table.

The Meter instruction instructs to use a Meter entry to perform simple QoS processing on a packet.

The Write-Metadata instruction instructs to write metadata. The metadata is a mechanism for transmitting information among OpenFlow flow tables, and metadata content corresponding to a packet may be transmitted to a subsequent flow table.

The control plane device 110 may implement control logic of a network service, determine to perform a specific operation on a specific packet to formulate a flow entry, and deliver the flow entry to the forwarding plane device 120. The forwarding plane device 120 stores the flow entry, matches received packets according to the match fields in the flow entry, and executes a corresponding instruction for a matched packet, that is, a target packet, so as to implement processing of various packets.

Specifically, the forwarding plane device 120 may store one or more flow tables. A match of a received packet may start from the first flow table. If the match succeeds, an instruction in a successfully-matched flow entry is executed. If an instruction for going to another flow table is included, the packet goes to the another flow table for subsequent matching and processing. If the match fails, the packet is processed according to a Table-Miss (table-miss) entry (for example, the packet may be dropped or sent to the control plane device 110 for processing). If there is no Table-Miss entry, how to process the packet may be determined according to a flow table attribute (for example, the attribute may be configured as dropped or sent to the control plane device 110 for processing).

A whole procedure for processing a packet by using all flow tables may be referred to as a pipeline (Pipeline). When the packet goes among the flow tables, four types of information about packet content, an ingress port (ingress port), metadata, and an action set is also correspondingly transmitted among the flow tables.

The Table-Miss entry mentioned above is a special entry in the OpenFlow flow table. This entry has no match field (that is, can successfully match all packets), has a lowest match priority, and is used to indicate how to process a packet that fails to match all the other flow entries in the flow table. If the Table-Miss entry is the only entry in a flow table, it means that in the flow table, all packets are processed according to the Table-Miss entry.

The following describes in detail the Meter table mentioned above. The Meter table is corresponding to the Meter instruction. A simple QoS control function may be completed by means of cooperation between the Meter table and the Meter instruction. A Meter entry used to process a data packet may be specified by using the Meter instruction. Multiple data streams may share a Meter entry, or a data stream may be processed by using multiple Meter entries.

The Meter table includes one or more Meter entries, and each Meter entry may include a Meter identifier (Meter Identifier, Meter ID), one or more Meter Bands (meter band), and Counters (counters). Because there is no standard Chinese expression for the Meter Band, the Meter Band in this application may be referred to as jiliangqidai, jiliangdai, jiliangxian, jiliangqixian, or the like.

A Meter entry may uniquely identified by a Meter ID. The Counters in the Meter entry may record statistics of the Meter entry.

The Meter Band may include the following content: a Band type (Band Type), a rate (Rate), a burst size (Burst Size), counters (Counters), and Type specific arguments (Type specific arguments).

The following describes the content in the Meter Band.

The Band Type specifies a packet processing manner, and only two manners are defined in the protocol, including drop (Drop) and differentiated services code point remark (DSCP (Differentiated Services Code Point) Remark).

The Rate specifies a rate value at which the Meter Band takes effect. If a current rate is greater than specified rates in multiple Meter Bands, a Meter Band with a maximum rate value actually takes effect, and a unit may be kbps (kilobits per second) or pps (packet per second).

The Burst Size specifies a size of traffic bursts (that is, traffic that can be cached), and a unit may be the same as that of the "Rate".

The Counters record statistics of the Meter Band.

The Type specific arguments are related to the Band type, when the Band type is drop, no other parameter needs to be carried; and when the type is DSCP remark, a to-be-set DSCP value needs to be carried.

The following describes in detail the queue (Queue) mechanism mentioned above. A queue is bound to a port, a port may correspond to one or more queues, and each queue is uniquely identified by a queue ID (Queue ID).

Each queue may define different queue properties. In addition to a queue length, queue properties that are already defined currently may include a maximum rate (MinRate) and a minimum rate (MaxRate).

The minimum rate may use one thousandth of a port rate as a unit. The maximum rate may use one thousandth of a port rate as a unit.

The foregoing Set-Queue instruction may be used to specify a queue that a packet is to enter, so that the packet may be processed by using attribute information of the queue.

The foregoing describes related mechanisms in the OpenFlow protocol. However, in the OpenFlow protocol, there is no effective mechanism to perform QoS processing on a packet. The following describes in detail a QoS control method and a device in an SDN network with reference to the embodiments of the present invention.

Figure 2:
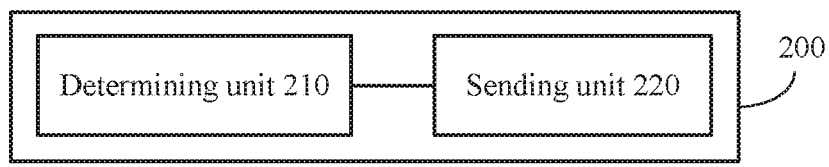
FIG. 2 is a schematic block diagram of a control plane device according to an embodiment of the present invention.

FIG. 2 is a schematic block diagram of a control plane device according to an embodiment of the present invention and mainly shows related functional parts in the control plane device that are used to implement QoS processing of a packet. A control plane device 200 in FIG. 2 includes a determining unit 210 and a sending unit 220. The control plane device 200 may implement functions of the control plane device 110 in FIG. 1.

The determining unit 210 is configured to determine a flow entry, where the flow entry includes QoS information, the QoS information is used to indicate a QoS processing rule, the QoS processing rule includes a QoS parameter, and the QoS processing rule is used to instruct to perform. QoS control on a data packet according to the QoS parameter.

The sending unit 220 is configured to send the flow entry to a forwarding plane device.

By sending the flow entry to the forwarding plane device, the forwarding plane device may perform QoS control on a target packet according to the QoS processing rule. The target packet is a data packet that matches the flow entry.

In this embodiment of the present invention, because QoS information included in a flow entry sent to a forwarding plane device is used to indicate a QoS processing rule, and the QoS processing rule includes a QoS parameter, the forwarding plane device can perform QoS control on a target packet according to the QoS processing rule, so that a QoS control function in an SDN network can be implemented.

In an optional implementation manner, the QoS parameter may include at least one of the following: a packet drop rate parameter, a delay parameter, a jitter parameter, or a rate limiting parameter.

Correspondingly, the QoS processing rule is used to indicate at least one of the following: performing packet drop control on the target packet according to the packet drop rate parameter; performing delay control on the target packet according to the delay parameter; performing jitter control on the target packet according to the jitter parameter; or performing rate limiting control on the target packet according to the rate limiting parameter.

Because the QoS processing rule may include parameters such as the packet drop rate parameter, the delay parameter, or the jitter parameter, a complex QoS control function in an SDN network can be implemented.

In an optional implementation manner, the function of the determining unit 210 in FIG. 2 may be implemented by using a general-purpose processor or a special-purpose processor, and the functions of the sending unit 220 in FIG. 2 may be implemented by using a communication component (for example, a transmitter, a network adapter, or a serial port device).

Optionally, in an implementation manner, the QoS information may include the QoS processing rule. In other words, in this case, the flow entry directly includes the QoS processing rule.

Optionally, in another optional implementation manner, the QoS processing rule may include at least one of the following instructions: a first instruction, a second instruction, a third instruction, or a fourth instruction. The first instruction may include the packet drop rate parameter, and the first instruction may be used to instruct to perform packet drop control on the target packet according to the packet drop rate parameter. The second instruction may include the delay parameter, and the second instruction may be used to instruct to perform delay control on the target packet according to the delay parameter. The third instruction may include the jitter parameter, and the third instruction may be used to instruct to perform jitter control on the target packet according to the jitter parameter. The fourth instruction may include the rate limiting parameter, and the fourth instruction may be used to instruct to perform rate limiting control on the target packet according to the rate limiting parameter.

The implementation of the first instruction, the second instruction, or the third instruction may be adding the foregoing three instructions to an existing OpenFlow instruction. For example, the first instruction is added, an input parameter of the first instruction is a packet drop rate parameter, and function logic for executing the first instruction is added to the forwarding plane device.

Optionally, in another implementation manner, the sending unit 220 may further be configured to send configuration information to the forwarding plane device. The configuration information may include the QoS processing rule and an index identifier corresponding to the QoS processing rule. The QoS information may include the foregoing index identifier. The corresponding QoS processing rule may be located in the configuration information according to the identifier. In other words, in this case, the flow entry includes the identifier of the QoS processing rule, so that load of transferring the flow entry between the control plane device and the forwarding plane device can be reduced.

Optionally, in another implementation manner, the configuration information may include a Meter entry, a Meter Band of the Meter entry includes the QoS processing rule, and the index identifier is an identifier of the Meter entry. Correspondingly, the QoS information includes a Meter instruction, and the Meter instruction includes the identifier of the Meter entry. That is, the QoS processing rule is carried in the Meter Band. The corresponding Meter entry may be located by using the identifier of the Meter entry, that is, the corresponding QoS processing rule may be obtained.

Optionally, in another implementation manner, the configuration information may include queue information, a queue in the queue information includes the QoS processing rule, and the index identifier is an identifier of the queue. Correspondingly, the QoS information includes a queue instruction, and the queue instruction includes the identifier of the queue. That is, the QoS processing rule may be carried in the queue. The corresponding queue may be located by using the identifier of the queue, that is, the corresponding QoS processing rule may be obtained.

Optionally, in another implementation manner, the QoS information may include a customized QoS processing instruction, the customized QoS processing instruction includes the index identifier, and the customized QoS processing instruction is used to instruct to obtain, according to the index identifier, the QoS processing rule from the configuration information. The forwarding plane device may perform QoS control according to the obtained QoS processing rule.

Figure 3:
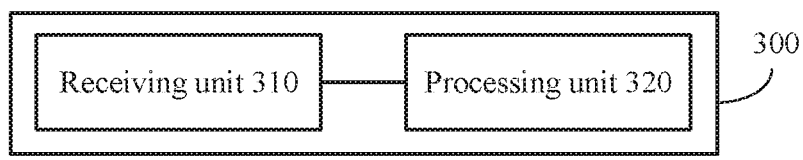
FIG. 3 is a schematic block diagram of a forwarding plane device according to an embodiment of the present invention.

FIG. 3 is a schematic block diagram of a forwarding plane device according to an embodiment of the present invention and mainly shows related functional parts in the forwarding plane device that are used to implement QoS processing of a packet. A forwarding plane device 300 in FIG. 3 includes a receiving unit 310 and a processing unit 320. Functions of the forwarding plane device 120*a*, the forwarding plane device 120*b*, or the forwarding plane device 120*c* in FIG. 1 may be implemented by the forwarding plane device 300 shown in FIG. 3. The forwarding plane device shown in FIG. 3 and the control plane device shown in FIG. 2 may cooperate with each other to perform QoS control.

The receiving unit 310 is configured to receive a data packet and receive a flow entry sent by a control plane device.

The processing unit 320 is configured to determine, according to the flow entry, that the data packet is a target packet, where the target packet is a data packet that matches the flow entry, the flow entry includes QoS information, the QoS information is used to indicate a QoS processing rule, and the QoS processing rule includes a QoS parameter; obtain the QoS processing rule according to the QoS information; and perform. QoS control on the target packet on a basis of the QoS parameter according to the QoS processing rule.

In this embodiment of the present invention, because QoS information included in a flow entry received from a control plane device is used to indicate a QoS processing rule, a forwarding plane device can perform QoS control on a target packet on a basis of a QoS parameter according to the QoS processing rule, so that a QoS control function in an SDN network can be implemented.

In an optional implementation manner, the functions of the processing unit 320 in FIG. 3 may be implemented by using a general-purpose processor or a special-purpose processor, and the functions of the receiving unit 310 in FIG. 3 may be implemented by using a communication component (for example, a receiver, a network adapter, or a serial port device).

Optionally, in an implementation manner, the QoS parameter may include at least one of the following: a packet drop rate parameter, a delay parameter, a jitter parameter, or a rate limiting parameter.

Correspondingly, that the processing unit 320 is configured to perform QoS control on the target packet on a basis of the QoS parameter according to the QoS processing rule may include at least one of the following:

the processing unit 320 is configured to perform packet drop control on the target packet on a basis of the packet drop rate parameter according to the QoS processing rule;

the processing unit 320 is configured to perform delay control on the target packet on a basis of the delay parameter according to the QoS processing rule;

the processing unit 320 is configured to perform jitter control on the target packet on a basis of the jitter parameter according to the QoS processing rule; or the processing unit 320 is configured to perform rate limiting control on the target packet on a basis of the rate limiting parameter according to the QoS processing rule.

In this embodiment of the present invention, because a QoS parameter includes parameters such as a packet drop rate parameter, a delay parameter, or a jitter parameter, a forwarding plane device can perform packet drop control on a target packet according to the packet drop rate parameter, perform delay control on a target packet according to the delay parameter, or perform jitter control on a target packet according to the jitter parameter, so that a complex QoS control function in an SDN network can be implemented.

Optionally, in another implementation manner, the QoS information may include the QoS processing rule. In other words, in this case, the flow entry directly includes the QoS processing rule.

The processing unit 320 may be configured to obtain the QoS processing rule from the QoS information.

Optionally, in another implementation manner, the QoS processing rule may include at least one of the following instructions: a first instruction, a second instruction, a third instruction, or a fourth instruction. For related content of the first instruction, the second instruction, the third instruction, and the fourth instruction, refer to related content of the embodiment shown in FIG. 2. Details are not described herein again.

Correspondingly, that the processing unit 320 is configured to perform QoS control on the target packet on a basis of the QoS parameter according to the QoS processing rule may include at least one of the following:

the processing unit 320 is configured to perform packet drop control on the target packet on a basis of the packet drop rate parameter according to the first instruction;

the processing unit 320 is configured to perform delay control on the target packet on a basis of the delay parameter according to the second instruction;

the processing unit 320 is configured to perform jitter control on the target packet on a basis of the jitter parameter according to the third instruction; or the processing unit 320 is configured to perform rate limiting control on the target packet on a basis of the rate limiting parameter according to the fourth instruction.

Optionally, in another implementation manner, the processing unit 320 may store configuration information, and the configuration information includes the QoS processing rule and an index identifier corresponding to the QoS processing rule. The QoS information may include the index identifier. For related content of the identifier, refer to related content of the embodiment shown in FIG. 2. Details are not described herein again.

The processing unit 320 may be configured to obtain the QoS processing rule from the configuration information according to the index identifier.

Optionally, in another implementation manner, the configuration information may include a Meter entry, a Meter Band of the Meter entry includes the QoS processing rule, and the index identifier is an identifier of the Meter entry. The QoS information may include a Meter instruction, and the Meter instruction includes the identifier of the Meter entry. For related content of the Meter entry and the Meter Band, refer to related content of the embodiment shown in FIG. 2. Details are not described herein again.

The processing unit 320 may be configured to obtain the Meter entry corresponding to the identifier of the Meter entry according to the Meter instruction, and obtain the QoS processing rule from the Meter Band of the Meter entry.

Optionally, in another implementation manner, the configuration information may include queue information, a queue in the queue information includes the QoS processing rule, and the index identifier is an identifier of the queue. The QoS information may include a queue instruction, and the queue instruction includes the identifier of the queue. For related content of the queue, refer to related content of the embodiment shown in FIG. 2. Details are not described herein again.

The processing unit 320 may be configured to obtain, from the queue information according to the queue instruction, the queue corresponding to the identifier of the queue, and obtain the QoS processing rule from the queue.

Optionally, in another implementation manner, the QoS information may include a customized QoS processing instruction, and the customized QoS processing instruction includes the index identifier. Correspondingly, the processing unit 320 may be configured to obtain the QoS processing rule corresponding to the index identifier from the configuration information according to the customized QoS processing instruction.

Figure 4:
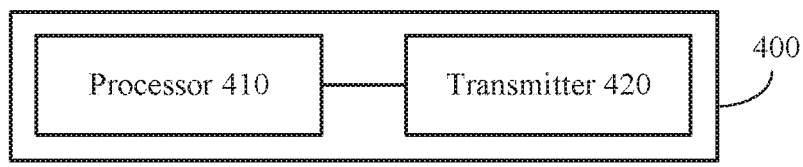
FIG. 4 is a schematic block diagram of a control plane device according to an embodiment of the present invention.

FIG. 4 is a schematic block diagram of a control plane device according to an embodiment of the present invention. A control plane device 400 in FIG. 4 includes a processor 410 and a transmitter 420.

The processor 410 is configured to implement the function of the determining unit 210 of the control plane device 200 in FIG. 2. The transmitter 420 is configured to implement the function of the sending unit 220 of the control plane device 200 in FIG. 2. Details are not described herein.

In this embodiment of the present invention, because QoS information included in a flow entry sent to a forwarding plane device is used to indicate a QoS processing rule, and the QoS processing rule includes a QoS parameter, the forwarding plane device can perform QoS control on a target packet according to the QoS processing rule, so that a QoS control function in an SDN network can be implemented.

Still further, because the QoS parameter may include parameters such as the packet drop rate parameter, the delay parameter, or the jitter parameter, a complex QoS control function in the SDN network can be implemented.

Figure 5:
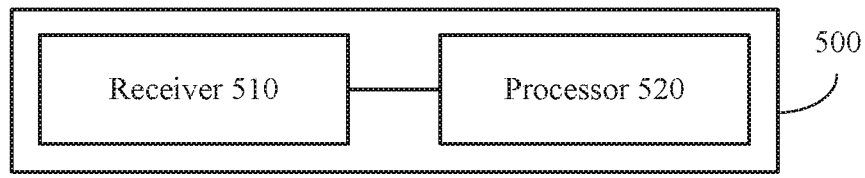
FIG. 5 is a schematic block diagram of a forwarding plane device according to an embodiment of the present invention.

FIG. 5 is a schematic block diagram of a forwarding plane device according to an embodiment of the present invention. A forwarding plane device 500 in FIG. 5 includes a receiver 510 and a processor 520.

The receiver 510 is configured to implement the function of the receiving unit 310 of the forwarding plane device 300 in FIG. 3. The processor 520 is configured to implement the function of the control unit 320 of the forwarding plane device 300 in FIG. 3. Details are not described herein.

In this embodiment of the present invention, because QoS information included in a flow entry received from a control plane device is used to indicate a QoS processing rule, and the QoS processing rule includes a QoS parameter, a forwarding plane device can perform QoS control on a target packet according to the QoS processing rule, so that a QoS control function in an SDN network can be implemented. Still further, because the QoS parameter may include at least one of a packet drop rate parameter, a delay parameter, or a jitter parameter, a complex QoS control function in the SDN network can be implemented.

The following describes, from a perspective of a control plane device, a QoS control method for SDN according to the embodiments of the present invention. The method is applicable to the control plane device 200 in FIG. 2 or the control plane device 400 in FIG. 4.

Figure 6:
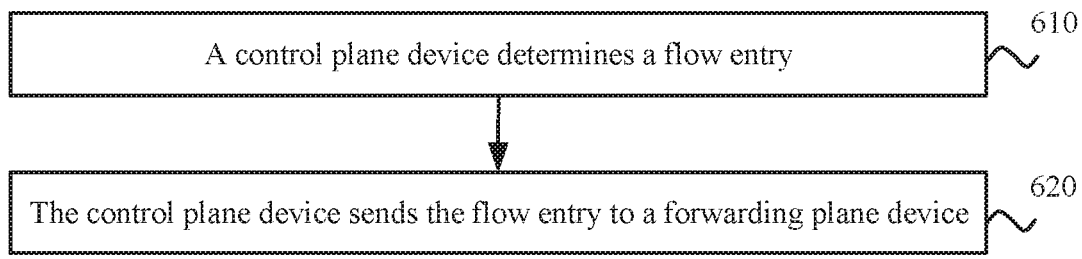
FIG. 6 is a schematic flowchart of a QoS control method for SDN according to an embodiment of the present invention.

FIG. 6 is a schematic flowchart of a QoS control method for SDN according to an embodiment of the present invention. The method in FIG. 6 is executed by the foregoing control plane device 200 or control plane device 400.

610. A control plane device determines a flow entry, where the flow entry includes QoS information, the QoS information is used to indicate a QoS processing rule, the QoS processing rule includes a QoS parameter, and the QoS processing rule is used to instruct to perform QoS control on a data packet according to the QoS parameter.

620. The control plane device sends the flow entry to a forwarding plane device.

The control plane device delivers the flow entry, so that the forwarding plane device may perform QoS control on a target packet according to the QoS processing rule. The target packet is a data packet that matches the flow entry.

In this embodiment of the present invention, because QoS information included in a flow entry sent by a control plane device to a forwarding plane device is used to indicate a QoS processing rule, and the QoS processing rule includes a QoS parameter, the forwarding plane device can perform QoS control on a target packet according to the QoS processing rule, so that a QoS control function in an SDN network can be implemented.

In addition, the QoS information used to indicate the QoS processing rule is sent by the control plane device to the forwarding plane device, QoS control may be flexibly performed on a service. Therefore, for a non-friendly service, a QoS characteristic of the non-friendly service can be reduced by performing QoS control on the non-friendly service, so that user experience of the non-friendly service can be reduced.

Optionally, in an implementation manner, the QoS parameter may include at least one of the following: a packet drop rate parameter, a delay parameter, a jitter parameter, or a rate limiting parameter.

Correspondingly, the QoS processing rule may be used to indicate at least one of the following:

performing packet drop control on the target packet according to the packet drop rate parameter;

performing delay control on the target packet according to the delay parameter;

performing jitter control on the target packet according to the jitter parameter; or performing rate limiting control on the target packet according to the rate limiting parameter.

In this embodiment of the present invention, because a QoS parameter includes parameters such as a packet drop rate parameter, a delay parameter, or a jitter parameter, a QoS processing rule can instruct to perform corresponding QoS control on a target packet according to any one of the foregoing parameters, so that a complex QoS control function in an SDN network can be implemented.

In this embodiment of the present invention, a packet drop rate may refer to a rate at which a data packet is dropped. A delay may refer to delayed time when a data packet passes through the forwarding plane device. A jitter (jitter) may refer to different delays of different data packets in a same service flow. For example, in a service flow, when a delay of a first data packet is 10 ms, a delay of a second data packet is 12 ms, and a delay of a third data packet is 8 ms, it indicates that a jitter exists. If delays of data packets are completely the same, no jitter exists, or a jitter is 0. The illustrations of the packet drop rate, the delay, and the jitter herein are also applicable to other embodiments of the present invention.

Optionally, in an implementation manner, if the flow entry includes a match field, the foregoing target packet may refer to a target packet that matches the match field. If the flow entry includes no match field, that is, includes a Table-Miss entry, the foregoing target packet may be a data packet that fails to match another flow entry in the flow table. If the Table-Miss entry is the only entry in the flow table, the target data may be all received data packets.

Optionally, in another implementation manner, in step 610, the foregoing QoS information may be included in an instruction field of the flow entry.

Optionally, in another implementation manner, in step 610, the control plane device may determine the flow entry according to the data packet received from the forwarding plane device. For example, the Table-Miss entry may instruct to forward a matched packet to the control plane device. When a data packet received by the forwarding plane device matches the Table-Miss entry, the forwarding plane device may forward the data packet to the control plane device. The control plane device may make a corresponding decision according to the data packet to determine the flow entry.

Optionally, in another implementation manner, in step 610, the foregoing QoS information may include the QoS processing rule.

Specifically, the control plane device may configure the QoS processing rule for the forwarding plane device by using the flow entry. The QoS processing rule may be placed in the instruction field of the flow entry. For example, the QoS processing rule may include parameters such as the packet drop rate parameter, the delay parameter, or the jitter parameter. In this way, the QoS processing rule that includes the QoS parameter is carried in the flow entry, so that an existing protocol is slightly changed, and the QoS processing rule can be more compatible with the existing protocol.

Optionally, in another implementation manner, when the QoS information includes the QoS processing rule, the QoS processing rule may include at least one of the following instructions: a first instruction, a second instruction, a third instruction, or a fourth instruction. The first instruction may include the packet drop rate parameter, and the first instruction may be used to instruct to perform packet drop control on the target packet according to the packet drop rate parameter. The second instruction may include the delay parameter, and the second instruction may be used to instruct to perform delay control on the target packet according to the delay parameter. The third instruction may include the jitter parameter, and the third instruction may be used to instruct to perform jitter control on the target packet according to the jitter parameter. The fourth instruction may include the rate limiting parameter, and the fourth instruction may be used to instruct to perform rate limiting control on the target packet according to the rate limiting parameter.

The foregoing first instruction, second instruction, and third instruction may be action instructions. The three instructions may be applied to an "Apply-Actions" instruction, or may be applied to a "Write-Actions" instruction.

Optionally, in another implementation manner, before step 610, the control plane device may send configuration information to the forwarding plane device, the configuration information may include the QoS processing rule and an index identifier corresponding to the QoS processing rule. The QoS information may include the foregoing index identifier.

In this embodiment of the present invention, the control plane device may preconfigure the QoS processing rule for the forwarding plane device. In this way, the flow entry may carry the index identifier corresponding to the QoS processing rule. In comparison with a solution in which the QoS processing rule is directly carried in the flow entry, signaling overheads can be reduced.

Optionally, in another implementation manner, the configuration information may include a Meter entry, a Meter Band of the Meter entry includes the QoS processing rule, and the index identifier is an identifier of the Meter entry. Correspondingly, the QoS information includes a Meter instruction, and the Meter instruction includes the identifier of the Meter entry.

Specifically, the QoS processing rule may be configured by using an existing Meter mechanism. For example, the QoS parameter may be added to each Band of the Meter entry. In this way, a QoS control function may be implemented with reference to a Meter instruction. For example, an instruction field of the flow entry may include a Meter instruction, and a parameter of the Meter instruction is a Meter entry ID. In this embodiment of the present invention, the QoS processing rule may be configured by using the existing Meter mechanism, and can be more compatible with an existing protocol.

Optionally, in another implementation manner, the configuration information may include queue information, a queue in the queue information includes the QoS processing rule, and the index identifier is an identifier of the queue. Correspondingly, the QoS information may include a queue instruction, and the queue instruction includes the identifier of the queue.

Specifically, the QoS processing rule may be configured by using an existing queue mechanism. For example, QoS parameters such as the packet drop rate parameter, the delay parameter, or the jitter parameter may be added to a queue property. Each queue has a corresponding queue ID.

In this way, a QoS control function may be implemented with reference to a set-queue instruction. For example, an instruction field of the flow entry may include a "Set-Queue" instruction, and a parameter of the Set-Queue instruction is a queue ID. In this embodiment of the present invention, the QoS processing rule is configured by using the existing queue mechanism, and can be more compatible with an existing protocol.

The queue information may be delivered to the forwarding plane device by the control plane device by using an OpenFlow message, or the queue information may be delivered to the forwarding plane device by using an OF-Cofig message, or the queue information may be configured for the forwarding plane device by using a network management system of the forwarding plane device.

In addition to implementing QoS control by using the Meter mechanism and the queue mechanism, QoS control may further be implemented by defining a new element in the OpenFlow. An example is given as follows:

Optionally, in another implementation manner, the QoS information may include a customized QoS processing instruction, the customized QoS processing instruction includes the index identifier, and the customized QoS processing instruction is used to instruct to obtain, according to the index identifier, the QoS processing rule from the configuration information.

Specifically, a new QoS element may be defined to configure the QoS processing rule.

For example, in this embodiment of the present invention, the QoS element may be represented by "QoSElement". Each "QoSElement" is identified by a corresponding ID, for example, may be represented by "QoSElement ID". The QoS element may include the following parameters:

a minimum rate (MinRate), referring to a minimum bandwidth that can be ensured;

a maximum rate (MaxRate), referring to a maximum bandwidth when resources permit;

a packet drop rate (DropRate), referring to a rate at which a packet is dropped;

a delay (DelayTime), referring to delayed time; and a jitter (JitterTime), referring to magnitude of a jitter.

The element "QoSElement" may simulate a QoS characteristic of a physical link, or may be used to simulate a QoS characteristic of a network node, so that network emulation is easy to be implemented.

In addition, a corresponding action instruction may be defined for the element "QoSElement", and the customized QoS processing instruction may be represented by "QoSHandle" herein. A parameter of the customized QoS processing instruction may be the "QoSElement". In this way, the "QoSHandle" instruction may be carried in the flow entry to implement QoS control.

In this embodiment of the present invention, a QoS processing rule is configured for a forwarding plane device by defining a new element, so that various QoS control functions such as a rate limiting function, a packet drop function, a delay function, or a jitter function can be flexibly implemented.

The following describes, from a perspective of a forwarding plane device, a QoS control method for SDN according to the embodiments of the present invention. The method is applicable to the forwarding plane device 300 in FIG. 3 or the control plane device 400 in FIG. 4.

Figure 7:
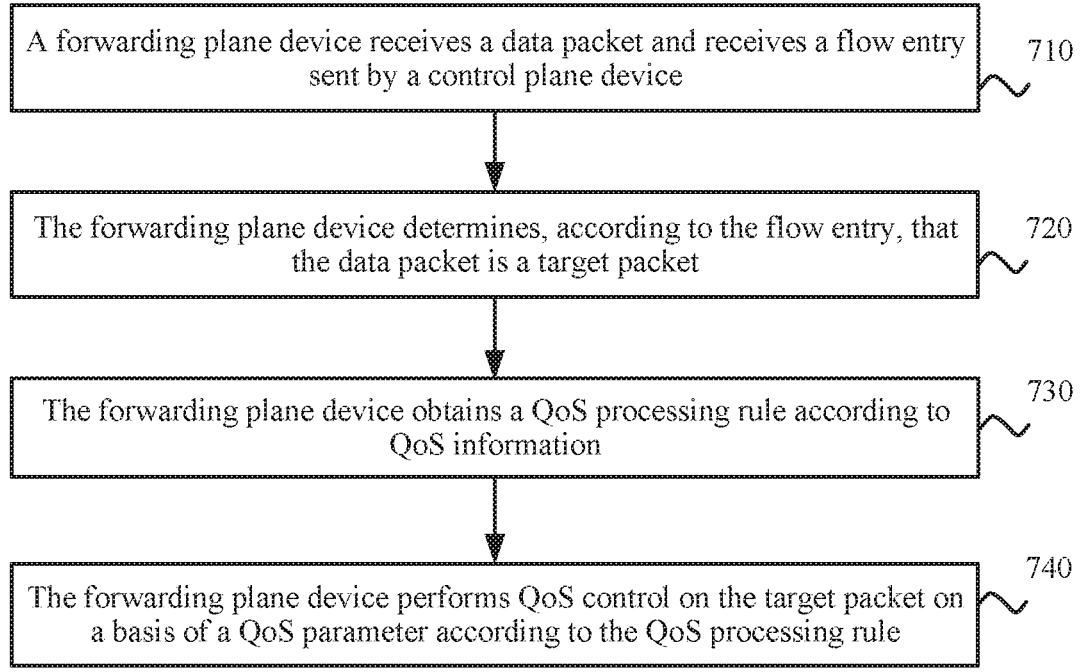
FIG. 7 is a schematic flowchart of a QoS control method for SDN according to an embodiment of the present invention.

FIG. 7 is a schematic flowchart of a QoS control method for SDN according to an embodiment of the present invention. The method in FIG. 7 is executed by a forwarding plane device, for example, the forwarding plane device 120*a*, the forwarding plane device 120*b*, or the forwarding plane device 120*c* in FIG. 1, the forwarding plane device 300 in FIG. 3, or the forwarding plane device 500 in FIG. 5. The method in FIG. 7 is corresponding to the method in FIG. 6. A person skilled in the art should know that the descriptions of the embodiment shown in FIG. 6 are also applicable to the method shown in FIG. 7, and therefore some content is not described again.

710. The forwarding plane device receives a data packet and receives a flow entry sent by a control plane device.

720. The forwarding plane device determines, according to the flow entry, that the data packet is a target packet, where the target packet is a target packet that matches the flow entry, the flow entry includes QoS information, the QoS information is used to indicate a QoS processing rule, and the QoS processing rule includes a QoS parameter.

730. The forwarding plane device obtains the QoS processing rule according to the QoS information.

740. The forwarding plane device performs QoS control on the target packet on a basis of the QoS parameter according to the QoS processing rule.

In this embodiment of the present invention, because QoS information included in a flow entry sent by a control plane device is used to indicate a QoS processing rule, and the QoS processing rule includes a QoS parameter, a forwarding plane device can perform QoS control on a target packet on a basis of the QoS parameter according to the QoS processing rule, so that a QoS control function in an SDN network can be implemented.

Optionally, in an implementation manner, the QoS parameter may include at least one of the following: a packet drop rate parameter, a delay parameter, a jitter parameter, or a rate limiting parameter.

Correspondingly, in step 740, that the forwarding plane device performs QoS control on the target packet on a basis of the QoS parameter according to the QoS processing rule may include at least one of the following:

performing, by the forwarding plane device, packet drop control on the target packet on a basis of the packet drop rate parameter according to the QoS processing rule;

performing, by the forwarding plane device, delay control on the target packet on a basis of the delay parameter according to the QoS processing rule;

performing, by the forwarding plane device, jitter control on the target packet on a basis of the jitter parameter according to the QoS processing rule; or performing, by the forwarding plane device, rate limiting control on the target packet on a basis of the rate limiting parameter according to the QoS processing rule.

In this embodiment of the present invention, because a QoS parameter includes parameters such as a packet drop rate parameter, a delay parameter, or a jitter parameter, a forwarding plane device can perform corresponding QoS control on a target packet according to any one of the foregoing parameters, so that a complex QoS control function in an SDN network can be implemented.

Optionally, in another implementation manner, the QoS information may include the QoS processing rule. In step 730, the forwarding plane device may obtain the QoS processing rule from the QoS information.

In this way, the QoS processing rule that includes the QoS parameter is carried in the flow entry, so that an existing protocol is slightly changed, and the QoS processing rule can be more compatible with the existing protocol.

Optionally, in another implementation manner, when the QoS information includes the QoS processing rule, the QoS processing rule may include at least one of the following instructions: a first instruction, a second instruction, a third instruction, or a fourth instruction. The first instruction may include the packet drop rate parameter. The second instruction may include the delay parameter. The third instruction may include the jitter parameter. The fourth instruction may include the rate limiting parameter.

Correspondingly, in step 740, that the forwarding plane device performs QoS control on the target packet on a basis of the QoS parameter according to the QoS processing rule may include at least one of the following:

performing, by the forwarding plane device, packet drop control on the target packet on a basis of the packet drop rate parameter according to the first instruction;

performing, by the forwarding plane device, delay control on the target packet on a basis of the delay parameter according to the second instruction;

performing, by the forwarding plane device, jitter control on the target packet on a basis of the jitter parameter according to the third instruction; or performing, by the forwarding plane device, rate limiting control on the target packet on a basis of the rate limiting parameter according to the fourth instruction.

Optionally, in another implementation manner, the forwarding plane device may store configuration information, and the configuration information includes the QoS processing rule and an index identifier corresponding to the QoS processing rule. The foregoing QoS information may include the index identifier. In step 730, the forwarding plane device may obtain the QoS processing rule from the QoS information according to the index identifier. In this embodiment of the present invention, signaling overheads can be reduced by preconfiguring the QoS processing rule and the index identifier corresponding to the QoS processing rule.

Optionally, in another implementation manner, the configuration information may include a Meter entry, a Meter Band of the Meter entry includes the QoS processing rule, and the index identifier is an identifier of the Meter entry.

The QoS information may include a Meter instruction, and the Meter instruction includes the identifier of the Meter entry.

Correspondingly, in step 730, the forwarding plane device may obtain the Meter entry corresponding to the identifier of the Meter entry according to the Meter instruction, and obtain the QoS processing rule from the Meter Band of the Meter entry. In this embodiment of the present invention, the QoS processing rule may be configured by using an existing Meter mechanism, and can be more compatible with an existing protocol.

Optionally, in another implementation manner, the configuration information may include queue information, a queue in the queue information includes the QoS processing rule, and the index identifier is an identifier of the queue. The QoS information may include a queue instruction, and the queue instruction includes the identifier of the queue.

Correspondingly, in step 730, the forwarding plane device obtains, from the queue information according to the queue instruction, the queue corresponding to the identifier of the queue, and obtains the QoS processing rule from the queue.

In this embodiment of the present invention, the QoS processing rule is configured by using an existing queue mechanism, and can be more compatible with an existing protocol.

Optionally, in another implementation manner, the QoS information may include a customized QoS processing instruction, and the customized QoS processing instruction includes the index identifier.

Correspondingly, in step 730, the forwarding plane device may obtain the QoS processing rule corresponding to the index identifier from the configuration information according to the customized QoS processing instruction.

In this embodiment of the present invention, a QoS processing rule is configured for a forwarding plane device by defining a new element, so that various QoS control functions such as a rate limiting function, a packet drop function, a delay function, or a jitter function can be flexibly implemented.

The following describes in detail, with reference to a specific example, a QoS control method for SDN according to the embodiments of the present invention. It should be understood that, these examples are merely intended to help a person skilled in the art better understand the embodiments of the present invention, but are not intended to limit the scope of the embodiments of the present invention. The foregoing descriptions in FIG. 1 to FIG. 7 of the QoS control method for SDN, the forwarding plane device, and the control plane device according to the embodiments of the present invention are also applicable to the following specific examples, and some content is not described again.

Figure 8:
FIG. 8 is a schematic flowchart of a process of a QoS control method for SDN according to an embodiment of the present invention.

FIG. 8 is a schematic flowchart of a process of a QoS control method for SDN according to an embodiment of the present invention.

In the method shown in FIG. 8, a control plane device may perform packet drop, delay, and jitter control on a forwarding plane device by expanding an action-related instruction in a flow entry.

Specifically, three action instructions including a first instruction, a second instruction, and a third instruction may be defined, so that the control plane device can perform packet drop, delay, and jitter control on the forwarding plane device.

In this embodiment of the present invention, the first instruction may be represented by "RamdomDrop". The first instruction may include a packet drop rate parameter, and the packet drop rate parameter may refer to a rate at which a packet is dropped. The first instruction may be used to instruct to perform packet drop control on a data packet according to the packet drop rate parameter. The packet drop rate parameter may be represented by "DropRate".

In addition, the second instruction may be represented by "Delay". The second instruction may carry a delay parameter, and the delay parameter may refer to time for delaying a data packet. The second instruction may be used to instruct to perform delay control on a data packet according to the delay parameter. The delay parameter may be represented by "DelayTime".

In addition, the third instruction may be represented by "Jitter". The third instruction may carry a jitter parameter, and the jitter parameter may refer to magnitude of an introduced jitter. The third instruction may be used to instruct to perform jitter control on a data packet according to the jitter parameter. The jitter parameter may be represented by "JitterTime".

In terms of usage, the foregoing three new defined action instructions are similar to an existing action instruction in the OpenFlow. For example, the three new action instructions may be used in an "Apply-Actions" instruction, or may be used in a "Write-Actions" instruction. In addition, the foregoing three new action instructions may be used in any combination, or may be used separately.

801. The control plane device determines a first flow entry.

For example, specific content of the first flow entry may be as follows:

Table ID=X, Match(SRC IP=1.1.1.1, DST IP=2.2.2.2), Instructions(Apply-Actions(RandomDrop(10%), Delay (10 ms), Jitter(5 ms), Output(Port 1))).

Specifically, an ID of a flow table in which the first flow entry is located may be X. The first flow entry may match a data packet whose source IP address is 1.1.1.1 and whose destination IP address is 2.2.2.2. An instruction field of the first flow entry may include an action instruction. "RandomDrop(10%)" may instruct to randomly drop 10% of the matched data packet. "Delay(10 ms)" may instruct to delay the matched data packet for 20 ms. "Jitter(5 ms)" may instruct to introduce a 5 ms jitter to the matched data packet. "Output(Port 1)" may instruct to send the matched data packet at a port 1. "Apply-Actions" may refer to immediately execute the foregoing instructions.

802. The control plane device sends the first flow entry to the forwarding plane device.

803. The forwarding plane device processes a first data packet according to the first flow entry.

The first data packet is a packet that matches the first flow entry. Specifically, the first data packet may be a packet whose source IP address is 1.1.1.1 and whose destination IP address is 2.2.2.2. The forwarding plane device may randomly drop 10% of the first data packet, delay the first data packet for 20 ms, introduce a 5 ms jitter to the first data packet, and then send out the first data packet at the first port 1.

804. The control plane device determines a second flow entry.

For example, specific content of the second flow entry may be as follows:

Table ID=Y, Table-Miss, Instructions (Apply-Actions (RandomDrop (2%), Output (Port 2))).

Specifically, an ID of a flow table in which the second flow entry is located may be Y. The second flow entry has no match field and can match all data packets. An instruction field of the second flow entry may include an action instruction. "RandomDrop (2%)" may instruct to randomly drop 2% of the matched data packet. "Output (Port 2)" may instruct to send out the matched data packet at a port 2. "Apply-Actions" may refer to immediately execute the foregoing instructions.

805. The control plane device sends the second flow entry to the forwarding plane device.

806. The forwarding plane device processes a second data packet according to the second flow entry.

The second data packet may be a packet that matches the second flow entry. Specifically, the second data packet may be a data packet that fails to match another flow entry stored in the forwarding plane device. The forwarding plane device may randomly drop 2% of the second data packet, and then send out the second data packet at the port 2.

807. The control plane device determines a third flow entry.

For example, specific content of the third flow entry may be as follows:

Table ID=Z, Table-Miss, Instructions(Output(CONTROLLER)).

Specifically, an ID of a flow table in which the third flow entry is located may be Z. The third flow entry has no match field and can match all data packets. An instruction field of the third flow entry may include an action instruction. "Output(CONTROLLER)" may instruct to forward the matched data packet to the control plane device.

808. The control plane device sends the third flow entry to the forwarding plane device.

809. The forwarding plane device sends, according to the third flow entry, a third data packet that matches the third flow entry to the control plane device.

The third data packet may be a data packet that fails to match another flow entry stored in the forwarding plane device.

810. The control plane device determines a fourth flow entry according to the third data packet.

For example, specific content of the fourth flow entry may be as follows:

Table ID=Z, Match(DST IP=3.3.3.3),
Instructions(Write-Actions(Delay(10 ms), Goto-Table (W))).

Specifically, an ID of a flow table in which the fourth flow entry is located may be Z. The fourth flow entry may match a data packet whose destination IP address is 2.2.2.2. An instruction field of the fourth flow entry may include an action instruction. "Delay(10 ms)" may instruct to delay the matched data packet for 10 ms. "Goto-Table (W)" may instruct to go to a flow entry W for continuous processing. "Write-Actions" may instruct to write the foregoing instructions into an action set corresponding to the data packet, and the foregoing instructions are not executed until a pipeline is complete.

811. The control plane device sends the fourth flow entry to the forwarding plane device.

812. The forwarding plane device processes a fourth data packet according to the fourth flow entry.

The fourth data packet may be a data packet that matches the fourth flow entry. Specifically, the fourth data packet may be a packet whose destination IP address is 2.2.2.2. The forwarding plane device may delay the fourth data packet for 10 ms, and then go to a flow entry W for continuous processing.

In this embodiment of the present invention, a control plane device sends a QoS processing rule to a forwarding plane device by using a flow entry, so that the forwarding plane device can perform QoS control on a target packet according to the QoS processing rule, and a QoS control function in an SDN network can be implemented.

Figure 9:
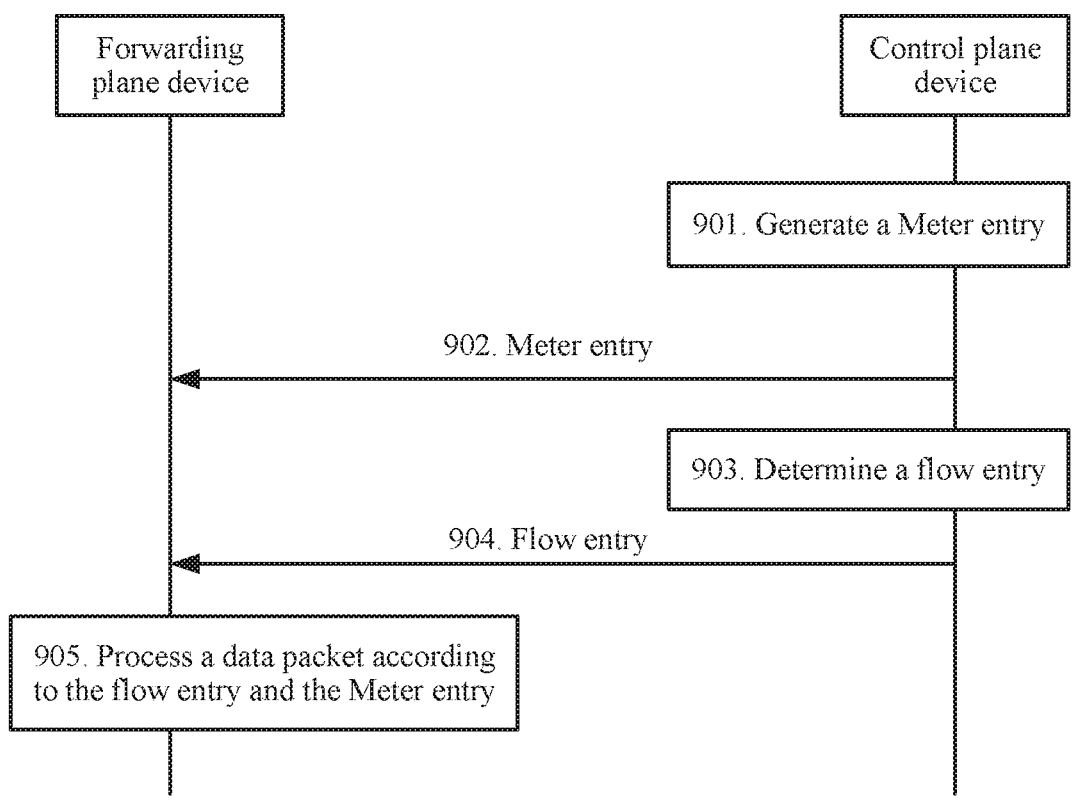
FIG. 9 is a schematic flowchart of a process of another QoS control method for SDN according to an embodiment of the present invention.

FIG. 9 is a schematic flowchart of a process of another QoS control method for SDN according to an embodiment of the present invention. In the method shown in FIG. 9, a control plane device may perform packet drop, delay, and jitter control on a forwarding plane device by expanding a Meter entry.

Specifically, a new Meter Band type may be defined, so that the control plane device performs packet drop, delay, and jitter control on the forwarding plane device. For example, the Meter Band type may be represented by "QoSAdjust".

The Meter Band may include at least one of the following parameters: a packet drop rate parameter, a delay parameter, or a jitter parameter.

For example, the packet drop rate parameter may be represented by "DropRate". The delay parameter may be represented by "DelayTime". The jitter parameter may be represented by "JitterTime".

In terms of usage, the new defined Meter Band type is similar to an existing Meter Band type. In addition, the new Meter Band type may be used in cooperation with the existing Meter Band type.

901. The control plane device generates a Meter entry.

The Meter entry may include a QoS processing rule and an ID of the Meter entry. For example, specific content of the Meter entry may be as follows:

Meter ID=1,
Band Type=DSCP Remark, Rate=1 Mbps, Burst Size=1 Mb, DSCP=2;
Band Type=QoSAdjust, Rate=2 Mbps, Burst Size=1 Mb, DelayTime=10 ms;
Band Type=QoSAdjust, Rate=3 Mbps, Burst Size=2 Mb, DelayTime=20 ms, JitterTime=5 ms;
Band Type=QoSAdjust, Rate=4 Mbps, Burst Size=2 Mb, DropRate=20%, DelayTime=40 ms, JitterTime=10 ms;
Band Type=Drop, Rate=5 Mbps, Burst Size=3 Mb.

Specifically, the ID of the Meter entry is 1. When a rate of a data packet is 0 to 1 Mbps, QoS control is not performed on the data packet. "Band Type=DSCP Remark, Rate=1 Mbps, Burst Size=1 Mb, DSCP=2" may instruct to set a DSDP of a data packet to 2 when a rate of the data packet is 1 to 2 Mbps. "Band Type=QoSAdjust, Rate=2 Mbps, Burst Size=1 Mb, DelayTime=10 ms" may instruct to delay a data packet for 10 ms when a rate of the data packet is 2 to 3 Mbps. "Band Type=QoSAdjust, Rate=3 Mbps, Burst Size=2 Mb, DelayTime=20 ms, JitterTime=5 ms" may instruct to, when a rate of a data packet is 3 to 4 Mbps, delay the data packet for 20 ms and introduce a 5 ms jitter. "Band Type=QoSAdjust, Rate=4 Mbps, Burst Size=2 Mb, DropRate=20%, DelayTime=40 ms, JitterTime=10 ms" may instruct to, when a rate of a data packet is 4 to 5 Mbps, drop randomly 20% of the data packet, delay the data packet for 40 ms, and introduce a 10 ms jitter to the data packet. "Band Type=Drop, Rate=5 Mbps, Burst Size=3 Mb" may instruct to drop a data packet when a rate of the data packet exceeds 5 Mbps.

902. The control plane device sends the Meter entry to the forwarding plane device.

903. The control plane device determines a flow entry.

Because QoS control is performed by using the Meter entry, a Meter instruction may be included in the flow entry. For example, for the foregoing exemplary Meter entry, content of the flow entry may be as follows:

Table ID=X, Match(SRC IP=1.1.1.1, IP Protocol=TCP),
Instructions(Meter 1, Apply-Actions (Output (Port 1)).

An ID of a flow table in which the flow entry is located may be X. The flow entry may match a TCP data packet whose source IP address is 1.1.1.1. "Meter 1" is a Meter instruction, and is used to instruct to perform QoS control on the matched data packet by using a Meter entry whose ID is 1. "Output(Port 1)" may instruct to send out the matched data packet at the port 1. "Apply-Actions" may instruct to immediately execute the instruction "Output(Port 1)".

904. The control plane device sends the flow entry to the forwarding plane device.

905. The forwarding plane device processes, according to the flow entry and the Meter entry, the data packet that matches the flow entry.

For example, in the foregoing example, the TCP data packet whose source IP address is 1.1.1.1 matches the flow entry. The forwarding plane device may perform QoS control on the data packet by using the Meter entry whose ID is 1, and send out the data packet at the port 1.

In this embodiment of the present invention, a QoS processing rule is preconfigured by using a Meter entry, and an identifier of the Meter entry is carried in a flow entry, so that a forwarding plane device can perform QoS control on a target packet according to the QoS processing rule in the Meter entry, and a QoS control function in an SDN network can be implemented.

Figure 10:
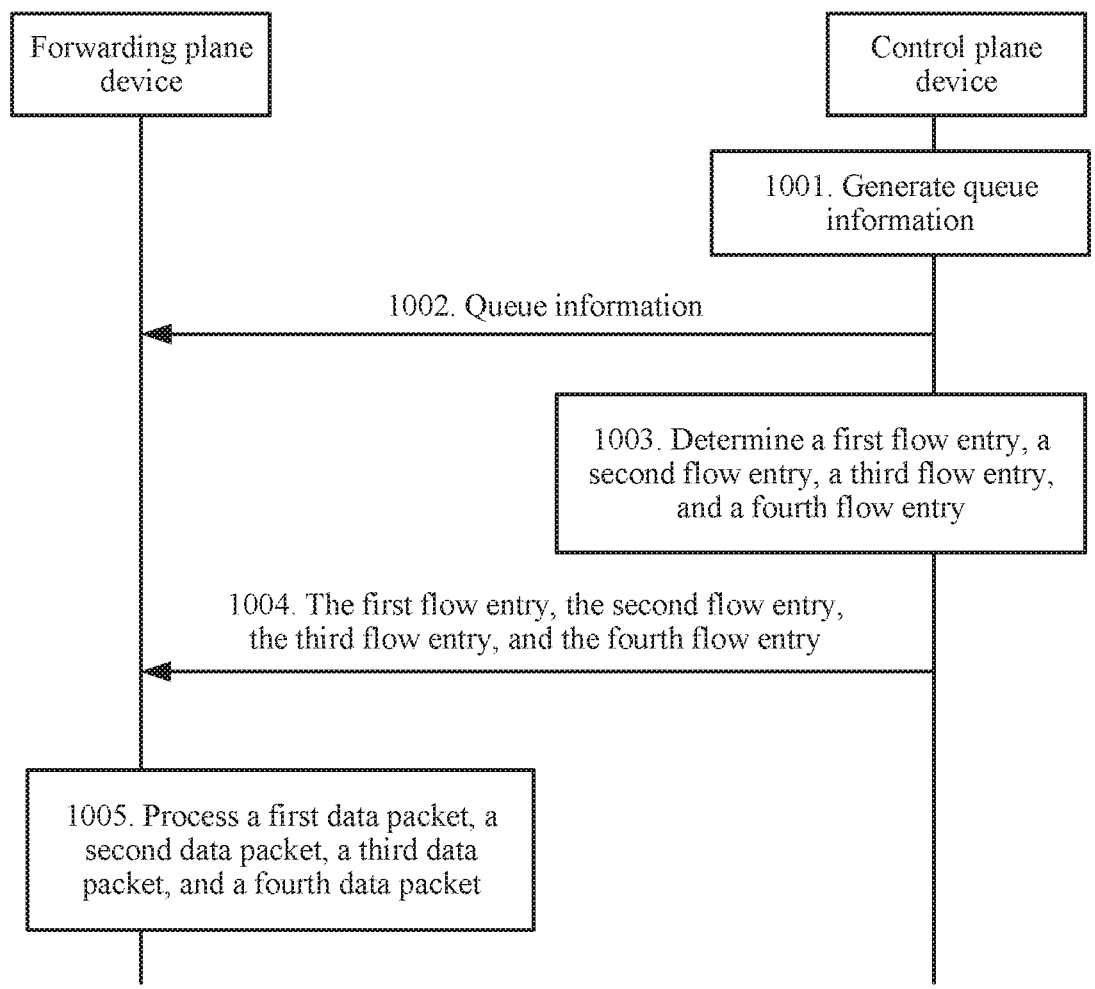
FIG. 10 is a schematic flowchart of still another QoS control method for SDN according to an embodiment of the present invention.

FIG. 10 is a schematic flowchart of still another QoS control method for SDN according to an embodiment of the present invention. In the method shown in FIG. 10, a control plane device may perform packet drop rate, delay, and jitter control on a forwarding plane device by expanding queue information.

Specifically, three new queue properties including a packet drop rate parameter, a delay parameter, and a jitter parameter may be defined.

For example, the packet drop rate parameter may be represented by "DropRate". The delay parameter may be represented by "DelayTime". The jitter parameter may be represented by "JitterTime".

Each queue may include at least one of the foregoing parameters. In addition, these parameters may also be used in combination with another queue property (for example, a maximum rate or a minimum rate).

In this embodiment, it is assumed that there are four queues at the port 1, and IDs of the four queues are respectively 1, 2, 3, and 4.

1001. The control plane device generates queue information.

Each queue in the queue information may include the foregoing new defined parameters.

For example, specific content of the queue information may be as follows:

Port ID=1:

Queue ID=1, MinRate=100%, MaxRate=250%, DropRate=10%;

Queue ID=2, MinRate=100%, MaxRate=250%, DelayTime=10 ms;

Queue ID=3, MinRate=100%, MaxRate=250%, DelayTime=10 ms, JitterTime=5 ms;

Queue ID=4, MinRate=100%, MaxRate=250%, DropRate=5%, DelayTime=10 ms, JitterTime=5 ms.

Specifically, "MinRate=100%, MaxRate=250%, DropRate=10%" may indicate that for a data packet in the queue 1, a minimum bandwidth is 100%, a maximum bandwidth is 250%, and 10% of the data packet is dropped. "MinRate=100%, MaxRate=250%, DelayTime=10 ms" may indicate that for a data packet in the queue 2, a minimum bandwidth is 100%, a maximum bandwidth is 250%, and a delay is 10 ms. "MinRate=100%, MaxRate=250%, DelayTime=10 ms, JitterTime=5 ms" may indicate that for a data packet in the queue 3, a minimum bandwidth is 100%, a maximum bandwidth is 250%, a delay is 10 ms, and an introduced jitter is 5 ms.

1002. The control plane device sends the queue information to the forwarding plane device.

For example, the control plane device may send the queue information by using an OpenFlow message or an OF-config message, or the control plane device may send the queue information to the forwarding plane device by using a network management system of the forwarding plane device.

1003. The control plane device determines a first flow entry, a second flow entry, a third flow entry, and a fourth flow entry on a basis of the queue information.

Assuming that the first flow entry, the second flow entry, the third flow entry, and the fourth flow entry may all belong to a same flow table, and assuming that an ID of the flow table is X, on a basis of the foregoing queue information, specific content of the first flow entry may be as follows:

Table ID=X, Match(SRC IP=1.1.1.1),

Instructions(Apply-Actions(Set-Queue(1), Output(Port 1)).

Specifically, the first flow entry may match a data packet whose source IP address is 1.1.1.1. "Set-Queue(1)" may instruct to perform QoS control on the matched data packet by using the queue whose ID is 1. "Output(Port 1)" may instruct to send out the matched packet at the port 1.

Specific content of the second flow entry may be as follows:

Table ID=X, Match(SRC IP=2.2.2.2),

Instructions(Apply-Actions(Set-Queue(2), Output(Port 1)).

Specifically, the second flow entry may match a data packet whose source IP address is 2.2.2.2. "Set-Queue(2)" may instruct to perform QoS control on the matched data packet by using the queue whose ID is 2.

Specific content of the third flow entry may be as follows:

Table ID=X, Match(SRC IP=3.3.3.3),

Instructions(Apply-Actions(Set-Queue(3), Output(Port 1)).

Specifically, the third flow entry may match a data packet whose source IP address is 3.3.3.3. "Set-Queue(3)" may instruct to perform QoS control on the matched data packet by using the queue whose ID is 3.

Specific content of the fourth flow entry may be as follows:

Table ID=X, Match(SRC IP=4.4.4.4),

Instructions(Apply-Actions(Set-Queue(4), Output(Port 1)).

Specifically, the fourth flow entry may match a data packet whose source IP address is 4.4.4.4. "Set-Queue(4)" may instruct to perform QoS control on the matched data packet by using the queue whose ID is 4.

1004. The control plane device sends the first flow entry, the second flow entry, the third flow entry, and the fourth flow entry to the forwarding plane device.

1005. The forwarding plane device processes a first data packet according to the first flow entry, processes a second data packet according to the second flow entry, processes a third data packet according to the third flow entry, and processes a fourth data packet according to the fourth flow entry.

Specifically, the first data packet can match the first flow entry. The second data packet can match the second flow entry. The third data packet can match the third flow entry. The fourth data packet can match the fourth flow entry.

The forwarding plane device may enable the first data packet to enter the queue 1, the second data packet to enter the queue 2, the third data packet to enter the queue 3, and the fourth data packet to the queue 4. After processing the corresponding data packets by using the queue 1 to the queue 4, the forwarding plane device may send out the data packets at the port 1.

In this embodiment of the present invention, a QoS processing rule is preconfigured by using a queue, and a queue identifier is carried in a flow entry, so that a forwarding plane device can perform QoS control on a target packet according to the QoS processing rule in the queue, and a QoS control function in an SDN network can be implemented.

Figure 11:
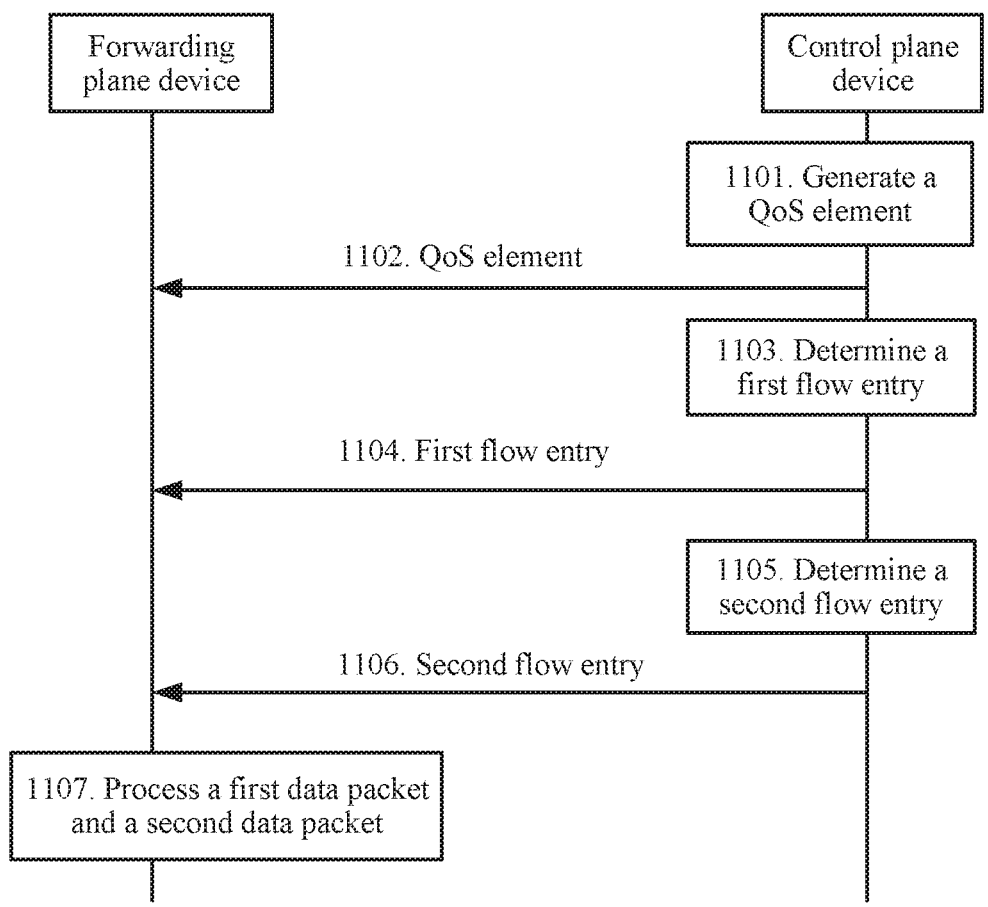
FIG. 11 is a schematic flowchart of a process of still another QoS control method for SDN according to an embodiment of the present invention.

FIG. 11 is a schematic flowchart of a process of still another QoS control method for SDN according to an embodiment of the present invention.

In the method shown in FIG. 11, a new element may be defined for OpenFlow, so that a control plane device performs rate limiting, packet drop rate, delay, or jitter control on a forwarding plane device. For example, the element may be referred to as a QoS element. The new QoS element may be represented by "QoSElement". The "QoSElement" may include the following parameters:

a minimum rate (MinRate), referring to a minimum bandwidth that can be ensured;

a maximum rate (MaxRate), referring to a maximum bandwidth when resources permit;

a packet drop rate (DropRate), referring to a rate at which a packet is dropped;

a delay (DelayTime), referring to delayed time; and a jitter (JitterTime), referring to magnitude of a jitter.

The element "QoSElement" may simulate a QoS characteristic of a physical link, or may be used to simulate a QoS characteristic of a network node, so that network emulation is easy to be implemented.

In addition, a corresponding action instruction may be defined for the element "QoSElement", and the corresponding action instruction may be referred to as a QoS processing instruction and may be represented by "QoSHandle" herein. A parameter of this instruction may be "QoSElement ID".

Figure 12:
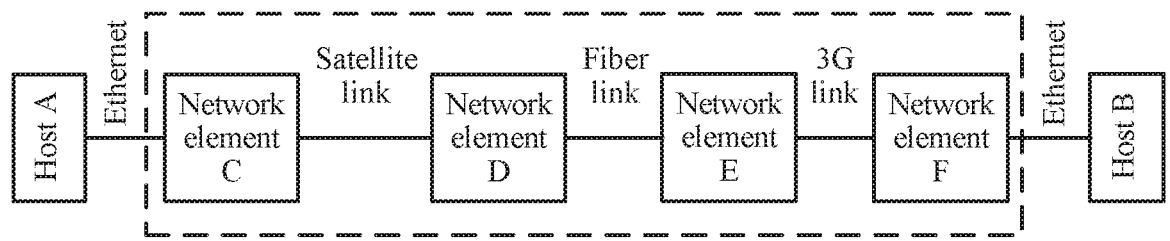
FIG. 12 is a schematic diagram of an exemplary network topology according to an embodiment of the present invention.

To clearer understand the method shown in FIG. 11, the following illustrates the method with reference to a network topology shown in FIG. 12.

FIG. 12 is a schematic diagram of an exemplary network topology according to an embodiment of the present invention.

As shown in FIG. 12, it is assumed that a host A is connected to a host B by using a network element C, a network element D, a network element E, and a network element F. A link between the network element C and the network element D may be a satellite link. A link between the network element D and the network element E may be a fiber link. A link between the network element E and the network element F may be a 3G link. The host A may communicate with the network element C by using Ethernet. The network element F may communicate with the host B by using Ethernet.

Figure 13:
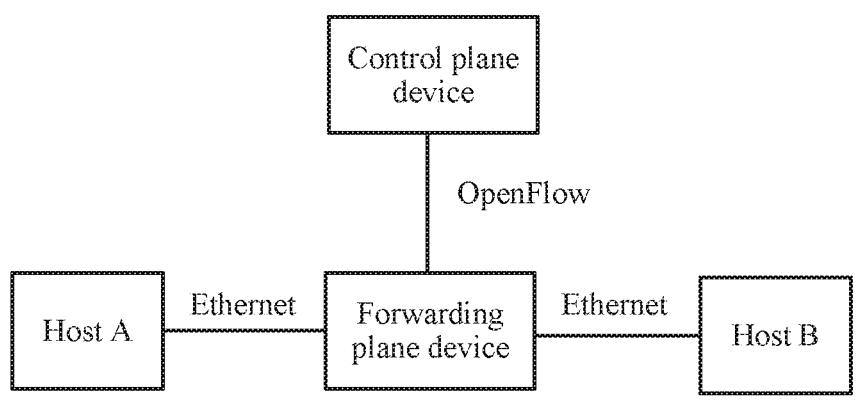
FIG. 13 is a schematic diagram of actual networking according to the network topology shown in FIG. 12.

A network between the host A and the host B, that is, a network in a dashed-line box in FIG. 12, may be simulated by using the foregoing new element "QoSElement". FIG. 13 is a schematic diagram of actual networking according to the network topology shown in FIG. 12. As shown in FIG. 13, the host A may communicate with the host B by using a forwarding plane device. A control plane device may control the forwarding plane device by using an OpenFlow protocol.

For brevity, assuming that the host A may directly communicate with the host B by using an IP address, and assuming that an IP address of the host A is 1.1.1.1 and an IP address of the host B may be 2.2.2.2, the following describes in detail an interactive process between the control plane device and the forwarding plane device.

1101. The control plane device generates a QoS element.

Specifically, the QoS element is still represented by the "QoSElement".

For example, the control plane device may generate seven "QoSElements", and each "QoSElement" has a corresponding ID. For example, specific content of the seven "QoSElements" may be as follows:

QoSElement ID=1, MinRate=1 Gbps, MaxRate=1 Gbps, DropRate=0.01%, DelayTime=10 ms, JitterTime=2 ms;

QoSElement ID=2, MinRate=20 Mbps, MaxRate=100 Mbps, DropRate=5%, DelayTime=100 ms, JitterTime=10 ms;

QoSElement ID=3, MinRate=10 Gbps, MaxRate=10 Gbps, DropRate=0.001%, DelayTime=5 ms, JitterTime=1 ms;

QoSElement ID=4, MinRate=1 Gbps, MaxRate=1 Gbps, DropRate=0.01%, DelayTime=5 ms, JitterTime=1 ms;

QoSElement ID=5, MinRate=40 Gbps, MaxRate=40 Gbps, DropRate=0.001%, DelayTime=5 ms, JitterTime=1 ms;

QoSElement ID=6, MinRate=1 Mbps, MaxRate=10 MGbps, DropRate=0.01%, DelayTime=20 ms, JitterTime=10 ms; and QoSElement ID=7, MinRate=1 Gbps, MaxRate=1 Gbps, DropRate=0.001%, DelayTime=5 ms, JitterTime=1 ms.

"MinRate=1 Gbps, MaxRate=1 Gbps, DropRate=0.01%, DelayTime=10 ms, JitterTime=2 ms" may indicate that for a data packet, a minimum bandwidth is 1 Gbps, a maximum bandwidth is 1 Gbps, 0.01% of the data packet is randomly dropped, a delay is 10 ms, and a 2 ms jitter is introduced.

By analogy, meanings of the other elements are similar, and details are not described.

It should be understood that the seven "QoSElements" are respectively corresponding to QoS characteristics of the network element C, the satellite link, the network element D, the fiber link, the network element E, the 3G link, and the network element F. For the satellite link and the 3G link, "MinRate" is less than "MaxRate", which may indicate that bandwidths of the two links are changeable. For the network element C, "MinRate" is equal to "MaxRate", and are both 1 Gbps, which may indicate that a throughput of the network element C is constant.

Then, a QoS element for processing the data packet may be indicated to the forwarding plane device by the control plane device by using the flow entry. The flow entry may include a QoS processing instruction and an ID of the "QoSElement". It is assumed that a first flow entry and a second flow entry belong to a same flow table, and it is assumed that an ID of the flow table is X.

1103. The control plane device determines a first flow entry.

For example, for the foregoing exemplary "QoSElement", content of the first flow entry may be as follows:

Table ID=X, Match(SRC IP=1.1.1.1, DST IP=2.2.2.2),

Instructions(Apply-Actions(QoSHandle(1), QoSHandle(2), QoSHandle(3), QoSHandle(4), QoSHandle(5), QoSHandle(6), QoSHandle(7)), Output(Port 2)).

The first flow entry may match a data packet whose source IP address is 1.1.1.1 and whose destination IP address is 2.2.2.2. "QosHandle(1)" may instruct to perform QoS control on the matched data packet by using the "QoSElement" whose ID is 1. Meanings of the other QoS processing instructions are similar to that of the "QosHandle(1)", and details are not described.

1104. The control plane device sends the first flow entry to the forwarding plane device.

1105. The control plane device determines a second flow entry.

For example, for the foregoing exemplary "QoSElement", content of the second flow entry may be as follows:

Table ID=X, Match(SRC IP=2.2.2.2, DST IP=1.1.1.1),
Instructions(Apply-Actions(QoSHandle(7), QoSHandle (6), QoSHandle(5), QoSHandle(4), QoSHandle(3), QoSHandle(2), QoSHandle(1)), Output(Port 1)).

The second flow entry may match a data packet whose source IP address is 2.2.2.2 and whose destination IP address is 1.1.1.1. Meanings of the QoS processing instructions in the second flow entry are similar to that of the "QoSHandle (1)" in the first flow entry, and details are not described.

1106. The forwarding plane device processes a first data packet according to the first flow entry, and processes a second data packet according to the second flow entry.

For example, the first data packet may be a data packet that matches the first flow entry, that is, a data packet whose source IP address is 1.1.1.1 and whose destination IP address is 2.2.2.2. The second data packet may be a data packet that matches the second flow entry, that is, a data packet whose source IP address is 2.2.2.2 and whose destination IP address is 1.1.1.1. The forwarding plane device may process the first data packet by sequentially using the QoS element 1 to the QoS element 7, and then send out the first data packet at the port 2. The forwarding plane device may process the second data packet by sequentially using the QoS element 7 to 1, and then send out the second data packet at the port 1.

In this embodiment of the present invention, a QoS processing rule is preconfigured by using a new defined QoS element, and an identifier of the QoS element is carried in a flow entry, so that a forwarding plane device can perform QoS control on a target packet according to the QoS processing rule in the QoS element, and a QoS control function in an SDN network can be implemented.

In addition, in the embodiments of the present invention, an implementation of a forwarding plane device becomes easy by means of a centralized-control by a control plane device, so that network elements and links of various QoS characteristics can be simulated to facilitate implementation of network emulation. Therefore, it helps a professional staff conduct various network experiments, such as a QoS testing experiment.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. On a basis of such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A control plane device, comprising:
at least one processor;
a non-transitory computer-readable storage medium coupled to the at least one processor and storing instructions for execution by the at least one processor, wherein the instructions instruct the at least one processor to:
determine a flow entry, wherein the flow entry comprises an instruction field, wherein the instruction field of the flow entry comprises quality of service (QoS) information, wherein the QoS information is used to indicate a QoS processing rule, wherein the QoS processing rule comprises a QoS parameter, and wherein the QoS processing rule is used to instruct to perform QoS control on a data packet according to the QoS parameter; and cause the control plane device to send the flow entry to a forwarding plane device, so that the forwarding plane device obtains the QoS processing rule, and performs QoS control on a target packet according to the QoS parameter in the QoS processing rule, wherein the target packet is a data packet that matches the flow entry.

2. The control plane device according to claim 1, wherein the QoS parameter comprises at least one of the following:

a packet drop rate parameter;
a delay parameter;
a jitter parameter; or
a rate limiting parameter; and
wherein, correspondingly, the QoS processing rule is used to indicate at least one of the following:

performing packet drop control on the target packet according to the packet drop rate parameter;
performing delay control on the target packet according to the delay parameter;
performing jitter control on the target packet according to the jitter parameter; or
performing rate limiting control on the target packet according to the rate limiting parameter.

3. The control plane device according to claim 1, wherein the QoS information comprises the QoS processing rule.

4. The control plane device according to claim 3, wherein the QoS processing rule comprises at least one of the following instructions:

a first instruction, wherein the first instruction comprises a packet drop rate parameter, and wherein the first instruction is used to instruct to perform packet drop control on the target packet according to the packet drop rate parameter;
a second instruction, wherein the second instruction comprises a delay parameter, and wherein the second instruction is used to instruct to perform delay control on the target packet according to the delay parameter;
a third instruction, wherein the third instruction comprises a jitter parameter, and wherein the third instruction is used to instruct to perform jitter control on the target packet according to the jitter parameter; or
a fourth instruction, wherein the fourth instruction comprises a rate limiting parameter, and wherein the fourth instruction is used to instruct to perform rate limiting control on the target packet according to the rate limiting parameter.

5. The control plane device according to claim 1, wherein the instructions instruct the at least one processor to cause the control plane device to send configuration information to the forwarding plane device, and wherein the configuration information comprises the QoS processing rule and an index identifier corresponding to the QoS processing rule; and wherein the QoS information comprises the index identifier.

6. The control plane device according to claim 5, wherein:

the configuration information comprises a meter entry, wherein a meter band of the meter entry comprises the QoS processing rule, and wherein the index identifier is an identifier of the meter entry, and wherein, correspondingly, the QoS information comprises a meter instruction, wherein the meter instruction comprises the identifier of the meter entry; or wherein the configuration information comprises queue information, wherein a queue in the queue information comprises the QoS processing rule, and wherein the index identifier is an identifier of the queue, and wherein, correspondingly, the QoS information comprises a queue instruction, wherein the queue instruction comprises the identifier of the queue; or wherein the QoS information comprises a customized QoS processing instruction, wherein the customized QoS processing instruction comprises the index identifier, and wherein the customized QoS processing instruction is used to instruct to obtain, according to the index identifier, the QoS processing rule from the configuration information.

7. A forwarding plane device, comprising:

a receiver, the receiver configured to receive a data packet and receive a flow entry sent by a control plane device;
at least one processor; and a non-transitory computer-readable storage medium coupled to the at least one processor and storing instructions for execution by the at least one processor, wherein the instructions instruct the at least one processor to:
determine, according to the flow entry, that the data packet is a target packet, wherein the target packet is a data packet that matches the flow entry, wherein the flow entry comprises an instruction field, wherein the instruction field of the flow entry comprises quality of service (QoS) information, wherein the QoS information is used to indicate a QoS processing rule, and wherein the QoS processing rule comprises a QoS parameter;
obtain the QoS processing rule according to the QoS information; and
perform QoS control on the target packet in accordance with the QoS parameter according to the QoS processing rule.

8. The forwarding plane device according to claim 7, wherein the QoS parameter comprises at least one of the following:

a packet drop rate parameter;
a delay parameter;
a jitter parameter; or
a rate limiting parameter; and
wherein, correspondingly, the instructions instructing the at least one processor to perform QoS control on the target packet in accordance with the QoS parameter according to the QoS processing rule comprises at least one of the following:

the instructions instruct the at least one processor to perform packet drop control on the target packet in accordance with the packet drop rate parameter according to the QoS processing rule;
the instructions instruct the at least one processor to perform delay control on the target packet in accordance with the delay parameter according to the QoS processing rule;
the instructions instruct the at least one processor to perform jitter control on the target packet in accordance with the jitter parameter according to the QoS processing rule; or
the instructions instruct the at least one processor to perform rate limiting control on the target packet in accordance with the rate limiting parameter according to the QoS processing rule.

9. The forwarding plane device according to claim 7, wherein the QoS information comprises the QoS processing rule; and wherein the instructions instructing the at least one processor to obtain the QoS processing rule according to the QoS information comprises:
the instructions instruct the at least one processor to obtain the QoS processing rule from the QoS information.

10. The forwarding plane device according to claim 9, wherein the QoS processing rule comprises at least one of the following instructions:
a first instruction, wherein the first instruction comprises a packet drop rate parameter;
a second instruction, wherein the second instruction comprises a delay parameter;
a third instruction, wherein the third instruction comprises a jitter parameter; or
a fourth instruction, wherein the fourth instruction comprises a rate limiting parameter; and
wherein correspondingly, the instructions instructing the at least one processor to perform QoS control on the target packet in accordance with the QoS parameter according to the QoS processing rule comprises at least one of the following:
the instructions instruct the at least one processor to perform packet drop control on the target packet in accordance with the packet drop rate parameter according to the first instruction;
the instructions instruct the at least one processor to perform delay control on the target packet in accordance with the delay parameter according to the second instruction;
the instructions instruct the at least one processor to perform jitter control on the target packet in accordance with the jitter parameter according to the third instruction; or
the instructions instruct the at least one processor to perform rate limiting control on the target packet in accordance with the rate limiting parameter according to the fourth instruction.

11. The forwarding plane device according to claim 7, wherein the at least one processor stores configuration information, and wherein the configuration information comprises the QoS processing rule and an index identifier corresponding to the QoS processing rule;
wherein the QoS information comprises the index identifier; and
wherein the instructions instructing the at least one processor to obtain the QoS processing rule according to the QoS information comprises:
the instructions instruct the at least one processor to obtain the QoS processing rule from the configuration information according to the index identifier.

12. The forwarding plane device according to claim 11, wherein the configuration information comprises a meter entry, wherein a meter band of the meter entry comprises the QoS processing rule, wherein the index identifier is an identifier of the meter entry, wherein the QoS information comprises a meter instruction, and wherein the meter instruction comprises the identifier of the meter entry; and
wherein, correspondingly, the instructions instruct the at least one processor to obtain the QoS processing rule from the configuration information according to the index identifier comprises:
the instructions instruct the at least one processor to obtain the meter entry corresponding to the identifier of the meter entry according to the meter instruction, and obtain the QoS processing rule from the meter band of the meter entry; or the configuration information comprises queue information, wherein a queue in the queue information comprises the QoS processing rule, wherein the index identifier is an identifier of the queue, wherein the QoS information comprises a queue instruction, and the queue instruction comprises the identifier of the queue; and
wherein, correspondingly, the instructions instructing the at least one processor to obtain the QoS processing rule from the configuration information according to the index identifier comprises:
the instructions instruct the at least one processor to obtain, from the queue information according to the queue instruction, the queue corresponding to the identifier of the queue, and obtain the QoS processing rule from the queue; or
the QoS information comprises a customized QoS processing instruction, wherein the customized QoS processing instruction comprises the index identifier; and
wherein, correspondingly, the instructions instructing the at least one processor to obtain the QoS processing rule from the configuration information according to the index identifier comprises:
the instructions instruct the at least one processor to obtain the QoS processing rule corresponding to the index identifier from the configuration information according to the customized QoS processing instruction.

13. A quality of service (QoS) control method for software-defined networking, the method comprising:
determining, by a control plane device, a flow entry, wherein the flow entry comprises an instruction field, wherein the instruction field of the flow entry comprises QoS information, wherein the QoS information is used to indicate a QoS processing rule, wherein the QoS processing rule comprises a QoS parameter, and wherein the QoS processing rule is used to instruct to perform QoS control on a data packet according to the QoS parameter; and
sending, by the control plane device, the flow entry to a forwarding plane device;
receiving, by a forwarding plane device, a data packet, and receiving the flow entry sent by the control plane device;
determining, by the forwarding plane device according to the flow entry, that the data packet is a target packet, wherein the target packet is a data packet that matches the flow entry;
obtaining, by the forwarding plane device, the QoS processing rule according to the QoS information; and
performing, by the forwarding plane device, QoS control on the target packet in accordance with the QoS parameter according to the QoS processing rule.

14. The method according to claim 13, wherein the QoS information comprises the QoS processing rule.

15. The method according to claim 14, wherein the QoS processing rule comprises at least one of the following instructions:
a first instruction, wherein the first instruction comprises a packet drop rate parameter, and wherein the first instruction is used to instruct to perform packet drop control on the target packet according to the packet drop rate parameter;
a second instruction, wherein the second instruction comprises a delay parameter, and the wherein second instruction is used to instruct to perform delay control on the target packet according to the delay parameter;

a third instruction, wherein the third instruction comprises a jitter parameter, and wherein the third instruction is used to instruct to perform jitter control on the target packet according to the jitter parameter; or a fourth instruction, wherein the fourth instruction comprises a rate limiting parameter, and wherein the fourth instruction is used to instruct to perform rate limiting control on the target packet according to the rate limiting parameter.

16. The method according to claim 13, wherein:
the QoS parameter comprises at least one of the following:
   a packet drop rate parameter;
   a delay parameter;
   a jitter parameter; or
   a rate limiting parameter; and
wherein, correspondingly, performing, by the forwarding plane device, QoS control on the target packet in accordance with the QoS parameter according to the QoS processing rule comprises at least one of the following:
   performing, by the forwarding plane device, packet drop control on the target packet in accordance with the packet drop rate parameter according to the QoS processing rule;
   performing, by the forwarding plane device, delay control on the target packet in accordance with the delay parameter according to the QoS processing rule;
   performing, by the forwarding plane device, jitter control on the target packet in accordance with the jitter parameter according to the QoS processing rule; or
   performing, by the forwarding plane device, rate limiting control on the target packet in accordance with the rate limiting parameter according to the QoS processing rule.

17. The method according to claim 13, wherein the QoS information comprises the QoS processing rule; and
   wherein obtaining, by the forwarding plane device, the QoS processing rule according to the QoS information comprises:
   obtaining, by the forwarding plane device, the QoS processing rule from the QoS information.

18. The method according to claim 17, wherein the QoS processing rule comprises at least one of the following instructions:
   a first instruction, wherein the first instruction comprises a packet drop rate parameter;
   a second instruction, wherein the second instruction comprises a delay parameter;
   a third instruction, wherein the third instruction comprises a jitter parameter; or
   a fourth instruction, wherein the fourth instruction comprises a rate limiting parameter; and
wherein, correspondingly, performing, by the forwarding plane device, QoS control on the target packet in accordance with the QoS parameter according to the QoS processing rule comprises at least one of the following:
   performing, by the forwarding plane device, packet drop control on the target packet in accordance with the packet drop rate parameter according to the first instruction;
   performing, by the forwarding plane device, delay control on the target packet in accordance with the delay parameter according to the second instruction;
   performing, by the forwarding plane device, jitter control on the target packet in accordance with the jitter parameter according to the third instruction; or
   performing, by the forwarding plane device, rate limiting control on the target packet in accordance with the rate limiting parameter according to the fourth instruction.

* * * * *